(12) United States Patent
Mao

(10) Patent No.: US 11,923,733 B2
(45) Date of Patent: Mar. 5, 2024

(54) HIGH EFFICIENCY HIGH DENSITY MOTOR AND GENERATOR WITH MULTIPLE AIRGAPS

(71) Applicant: Quantentech Limited, Grand Cayman (KY)

(72) Inventor: Hengchun Mao, Allen, TX (US)

(73) Assignee: Quantentech Limited, Grand Cayman (KY)

( * ) Notice: Subject to any disclaimer, the term of this patent is extended or adjusted under 35 U.S.C. 154(b) by 273 days.

(21) Appl. No.: 17/407,273

(22) Filed: Aug. 20, 2021

(65) Prior Publication Data

US 2022/0069685 A1 Mar. 3, 2022

Related U.S. Application Data

(60) Provisional application No. 63/071,474, filed on Aug. 28, 2020.

(51) Int. Cl.
*H02K 16/02* (2006.01)
*H02K 17/14* (2006.01)

(52) U.S. Cl.
CPC ............ *H02K 16/02* (2013.01); *H02K 17/14* (2013.01); *H02K 2201/03* (2013.01)

(58) Field of Classification Search
CPC ........ H02K 16/00; H02K 16/02; H02K 16/04; H02K 17/14; H02K 2201/03
USPC ........................................................ 310/114
See application file for complete search history.

(56) References Cited

U.S. PATENT DOCUMENTS

| | | | | |
|---|---|---|---|---|
| 4,501,980 A | * | 2/1985 | Welburn | H02K 37/02 318/135 |
| 4,731,554 A | * | 3/1988 | Hall | H02K 21/12 310/67 R |
| 6,590,312 B1 | * | 7/2003 | Seguchi | B60K 6/40 310/156.01 |
| 6,727,632 B2 | * | 4/2004 | Kusase | H02K 21/24 310/191 |
| 6,998,757 B2 | * | 2/2006 | Seguchi | H02K 21/16 310/68 B |
| 7,078,840 B2 | * | 7/2006 | Kusase | H02K 21/12 310/116 |
| 7,671,500 B2 | * | 3/2010 | Masuda | H02K 21/14 310/119 |
| 8,464,511 B1 | * | 6/2013 | Ribarov | H02K 7/14 60/268 |
| 8,816,554 B2 | * | 8/2014 | Li | H02K 21/029 310/112 |

(Continued)

*Primary Examiner* — Rashad H Johnson
(74) *Attorney, Agent, or Firm* — AP3 Law Firm PLLC

(57) ABSTRACT

An apparatus includes a stator with an inner surface and an outer surface, a plurality of rotors magnetically coupled to the stator, wherein a first rotor faces the inner surface of the stator and a second rotor faces the outer surface of the stator, and a first airgap between the inner surface of the stator and the first rotor, and a second airgap between the outer surface of the stator and the second rotor, wherein first conductors, the first airgap, and the first rotor form a first submotor, and second conductors, the second airgap, and the second rotor form a second submotor, and wherein the first submotor and the second submotor are so configured that the first rotor and the second rotor produce mechanical torques in a same direction when currents flow in the plurality of windings in an operation mode.

20 Claims, 21 Drawing Sheets

(56) References Cited

U.S. PATENT DOCUMENTS

| | | | |
|---|---|---|---|
| 8,847,464 B2* | 9/2014 | Qu | H02K 21/12 |
| | | | 310/266 |
| 8,884,491 B2* | 11/2014 | Kusase | B60L 15/20 |
| | | | 310/156.49 |
| 9,240,748 B2 | 1/2016 | Mao | |
| 9,252,634 B2* | 2/2016 | Kondou | H02K 21/12 |
| 9,490,740 B2 | 11/2016 | Mao | |
| 9,537,362 B2* | 1/2017 | Jansen | H02K 1/276 |
| 9,800,193 B2 | 10/2017 | Mao et al. | |
| 10,038,353 B2* | 7/2018 | Kusase | H02K 9/19 |
| 10,050,503 B2* | 8/2018 | Yamada | H02K 19/28 |
| 2002/0047418 A1* | 4/2002 | Seguchi | H02K 21/16 |
| | | | 310/114 |
| 2003/0102764 A1* | 6/2003 | Kusase | H02K 1/27 |
| | | | 310/67 R |
| 2006/0138879 A1* | 6/2006 | Kusase | H02K 21/22 |
| | | | 310/156.43 |
| 2008/0197730 A1* | 8/2008 | Himmelmann | B60K 6/547 |
| | | | 475/198 |
| 2009/0072645 A1* | 3/2009 | Quere | H02K 16/00 |
| | | | 310/114 |
| 2009/0072650 A1* | 3/2009 | Yoshikawa | H02K 16/02 |
| | | | 310/156.43 |
| 2009/0224628 A1* | 9/2009 | Hiwaki | H02K 16/02 |
| | | | 310/216.113 |
| 2009/0243411 A1* | 10/2009 | Moeller | B60K 6/26 |
| | | | 310/90 |
| 2009/0309442 A1* | 12/2009 | Qu | H02K 21/24 |
| | | | 310/156.48 |
| 2010/0139999 A1* | 6/2010 | Park | H02K 7/102 |
| | | | 310/114 |
| 2012/0007453 A1* | 1/2012 | Leiber | H02K 1/20 |
| | | | 310/43 |
| 2013/0099618 A1* | 4/2013 | Kusase | H02K 21/14 |
| | | | 310/156.56 |
| 2014/0285057 A1* | 9/2014 | Aoyama | H02K 19/12 |
| | | | 310/210 |
| 2015/0137655 A1* | 5/2015 | Maekawa | H02K 1/27 |
| | | | 310/216.129 |
| 2015/0270754 A1* | 9/2015 | Kusase | H02K 9/19 |
| | | | 310/59 |
| 2016/0028296 A1* | 1/2016 | Kusase | H02K 21/12 |
| | | | 310/156.01 |
| 2016/0087517 A1* | 3/2016 | Powell | H02K 7/1823 |
| | | | 310/103 |
| 2016/0164386 A1* | 6/2016 | Kusase | H02K 16/04 |
| | | | 310/156.01 |
| 2016/0248307 A1* | 8/2016 | Kubota | H02K 19/36 |
| 2016/0352203 A1* | 12/2016 | Kusase | H02K 19/12 |
| 2018/0034353 A1* | 2/2018 | Gieras | H02K 1/146 |
| 2018/0159408 A1* | 6/2018 | Hattori | H02K 21/12 |
| 2018/0219439 A1* | 8/2018 | Namba | H02K 1/18 |
| 2019/0058364 A1 | 2/2019 | Mao et al. | |
| 2019/0058430 A1 | 2/2019 | Mao et al. | |
| 2020/0099327 A1* | 3/2020 | Nashiki | H02K 3/28 |
| 2020/0204099 A1 | 6/2020 | Mao | |
| 2020/0227988 A1* | 7/2020 | Zhu | B64C 11/46 |
| 2022/0069685 A1* | 3/2022 | Mao | H02K 16/02 |
| 2022/0209703 A1* | 6/2022 | Mao | H02K 3/28 |
| 2023/0024385 A1* | 1/2023 | Lim | H02K 1/16 |

* cited by examiner

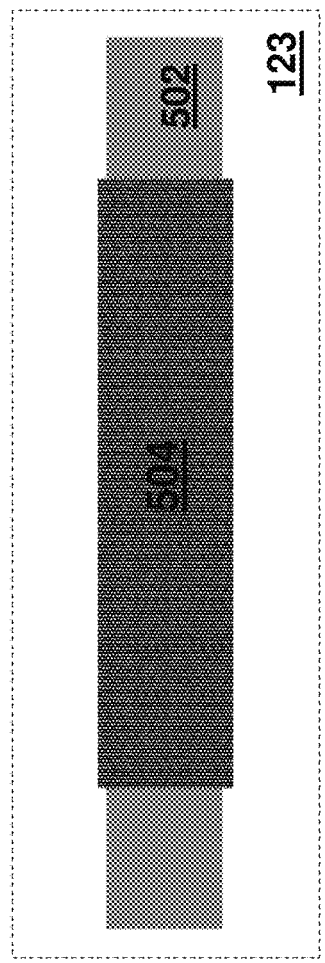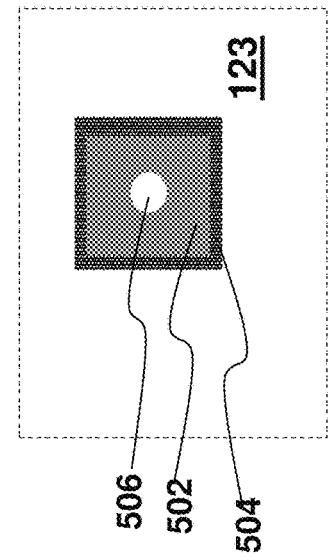
Figure 5

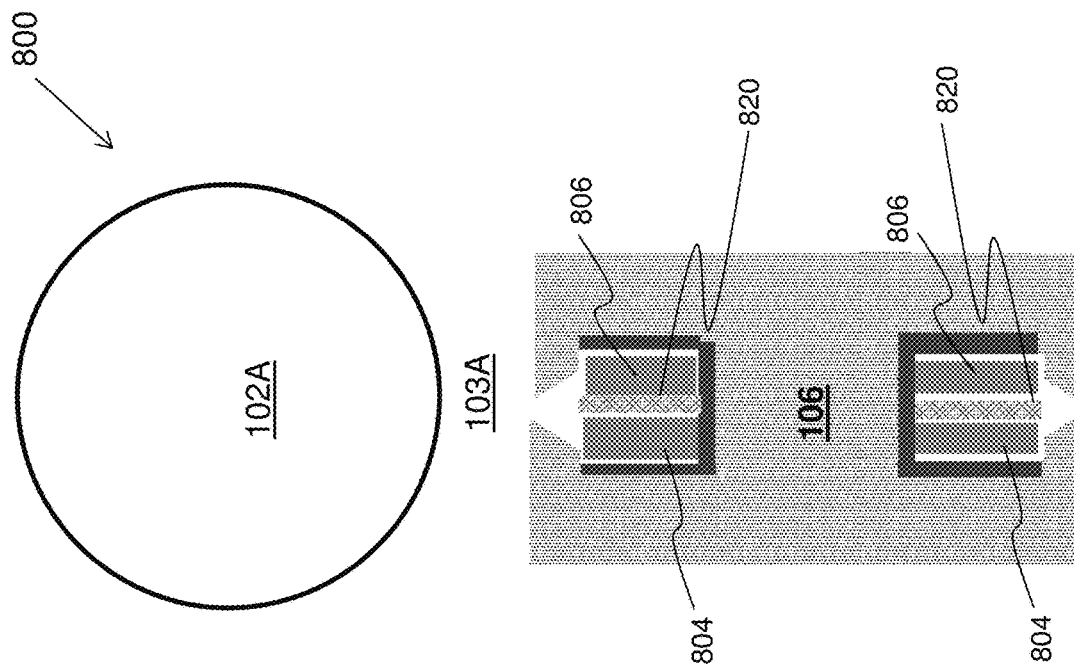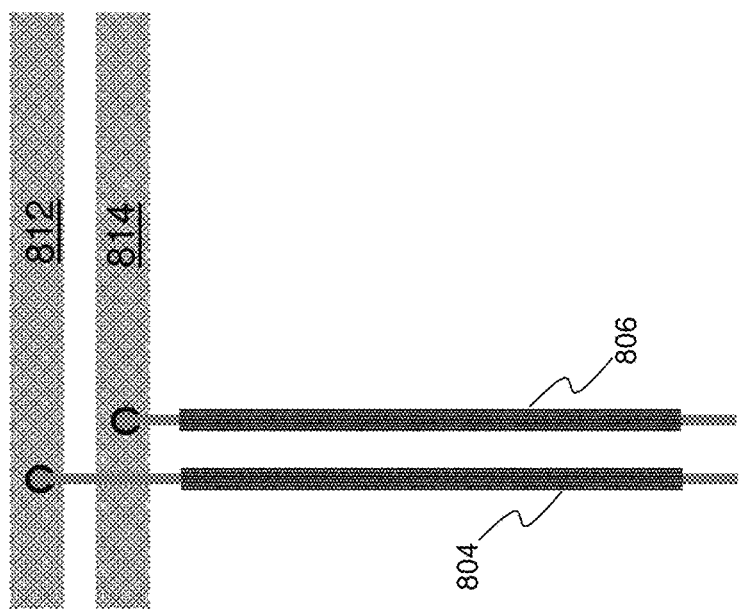
Figure 8

1100

First Section

| Slot # | S1 | S2 | S3 | S4 | S5 | S6 | S7 | S8 | S9 | S10 | S11 | S12 | S13 | S14 | S15 | S16 | S17 | S18 |
|---|---|---|---|---|---|---|---|---|---|---|---|---|---|---|---|---|---|---|
| First Coil | I | A | B | B | C | C | D | D | E | E | F | F | G | G | H | H | I | I |
| Second Coil | A | A | B | C | C | D | D | E | E | F | F | G | G | H | H | I | I | I |

Second Section

| Slot # | S19 | S20 | S21 | S22 | S23 | S24 | S25 | S26 | S27 | S28 | S29 | S30 | S31 | S32 | S33 | S34 | S35 | S36 |
|---|---|---|---|---|---|---|---|---|---|---|---|---|---|---|---|---|---|---|
| First Coil | I | A | B | B | C | C | D | D | E | E | F | F | G | G | H | H | I | I |
| Second Coil | A | A | B | C | C | D | D | E | E | F | F | G | G | H | H | I | I | I |

Figure 11

HIGH EFFICIENCY HIGH DENSITY MOTOR AND GENERATOR WITH MULTIPLE AIRGAPS

CROSS REFERENCE TO RELATED APPLICATIONS

This application is related to and claims priority to U.S. Provisional Application No. 63/071,474, titled, "High Efficiency High Density Motor and Generator with Multiple Airgaps" filed on Aug. 28, 2020, which is herein incorporated by reference.

TECHNICAL FIELD

The present invention relates to electrical motors and generators, and electrical drives and controls, and, in particular embodiments, to novel motor and generator structures, and the use of novel power electronics equipment and control mechanism to drive and control them.

BACKGROUND

Electric machines (including motors and generators) are an apparatus converting energy between electric supply and mechanical motion. There are different types of electric machines, including induction machine, permanent magnets machines, switching reluctance machines, synchronous reluctance machines, and hybrid machines, with rotational, linear or other patterns of mechanical movement. The various embodiments in this disclosure are applicable to all types of electrical machines, including the above types of electric machines as both motors and generators, but motors as an example will be used to illustrate the innovative aspects of the present disclosure. The technologies disclosed will be discussed with a rotary machine as an example, but they can also be applied to machines with other forms of movement, such as linear machines. In most applications motors and generators operate at variable speed. Power electronics equipment is used to operate with the motors and generators in such variable speed systems, including but not limited to industrial drives, electrical vehicles, diesel-generator sets, and wind power generation. There is a strong desire to increase the efficiency of such systems, while reducing its cost and size, especially for demanding applications such as electrical cars and other transportation equipment.

A motor or generator usually comprises a stator and a rotor. The stator is the stationary part, and the rotor is the rotating or moving part, which may rotate or move in linear or other fashion against the stator, depending on the mechanical design. The rotor may be inside the stator, outside the stator, or beside the stator as in an axial field machine. A small airgap exists between the rotor and the stator for mechanical clearance and mechanical torque generation, and it is where the electro-mechanical energy conversion occurs. To improve the performance, it is desirable to be able to have multiple airgaps in a motor or generator. Unfortunately, so far, such multi airgap motors and generators are not widely used because the design and control of such a system are too difficult and complex. Significant improvement is needed to further optimize system performance and reduce the system cost.

SUMMARY OF THE INVENTION

These and other problems are generally solved or circumvented, and technical advantages are generally achieved, by preferred embodiments of the present invention which provides an improved motor/generator and drive systems.

In accordance with an embodiment, an apparatus comprises a stator with an inner surface and an outer surface, wherein a plurality of first slots is distributed along the inner surface and is separated from each other by a plurality of first teeth, a plurality of second slots is distributed along the outer surface and is separated from each other by a plurality of second teeth, and a plurality of windings is located between the inner surface and the outer surface, each of the plurality of windings comprising a plurality of first conductors located in a first slot and a plurality of second conductors located in a second slot adjacent to the first slot, a plurality of rotors magnetically coupled to the stator, wherein a first rotor of the plurality of rotors faces the inner surface of the stator and a second rotor of the plurality of rotors faces the outer surface of the stator, and a first airgap between the inner surface of the stator and the first rotor, and a second airgap between the outer surface of the stator and the second rotor, wherein the plurality of first conductors, the first airgap, and the first rotor form a first submotor, and the plurality of second conductors, the second airgap, and the second rotor form a second submotor, and wherein the first submotor and the second submotor are so configured that the first rotor and the second rotor produce mechanical torques in a same direction when currents flow in the plurality of windings in an operation mode.

In accordance with another embodiment, a system includes a stator with an inner surface and an outer surface, wherein a plurality of first slots is distributed along the inner surface and is separated from each other by a plurality of first teeth, a plurality of second slots distributed along the outer surface and is separated from each other by a plurality of second teeth, and a plurality of windings is located between the inner surface and the outer surface, each of the plurality of windings comprising a plurality of first conductors in a first slot and a plurality of second conductors in a second slot adjacent to the first slot, a plurality of rotors magnetically coupled to the stator, wherein a first rotor faces the inner surface of the stator and a second rotor faces the outer surface of the rotor, a first airgap between the inner surface of the stator and the first rotor, and a second airgap between the outer surface of the stator and the second rotor, wherein the plurality of first conductors, the first airgap, and the first rotor form a first submotor, and the plurality of second conductors, the second airgap, and the second rotor form a second submotor, and a plurality of power converters coupled to the plurality of windings, wherein the plurality of power converters are configured to control currents in the plurality of windings so that the first submotor and the second submotor are configured to produce mechanical torques in a same direction in an operation mode.

In accordance with yet another embodiment, a method comprises providing a stator with an inner surface and an outer surface, wherein a plurality of first slots is distributed along the inner surface and is separated from each other by a plurality of first teeth, and a plurality of second slots is distributed along the outer surface and is separated from each other by a plurality of second teeth, arranging a plurality of windings between the inner surface and the outer surface, each of the plurality of windings comprising a plurality of first conductors in a first slot and a plurality of second conductors in a second slot adjacent to the first slot, providing a plurality of rotors magnetically coupled to the stator, wherein a first rotor of the plurality of rotors faces the inner surface of the stator and a second rotor of the plurality of rotors faces the outer surface of the stator, arranging a first airgap between the inner surface of the stator and the first rotor, and a second airgap between the outer surface of the stator and the second rotor, and configuring the plurality of first conductors, the first airgap, and the first rotor to form a first submotor, and the plurality of second conductors, the second airgap, and the second rotor to form to a second submotor, so that the first submotor and the second submotor produce mechanical torques in a same direction in an operation mode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a simplified view of a conductor of a motor in accordance with various embodiments of the present disclosure;

FIG. 8 illustrates another arrangement of multiple windings in a pair of slots in accordance with various embodiments of the present disclosure;

FIG. 11 illustrates a winding arrangement in slots of a motor in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
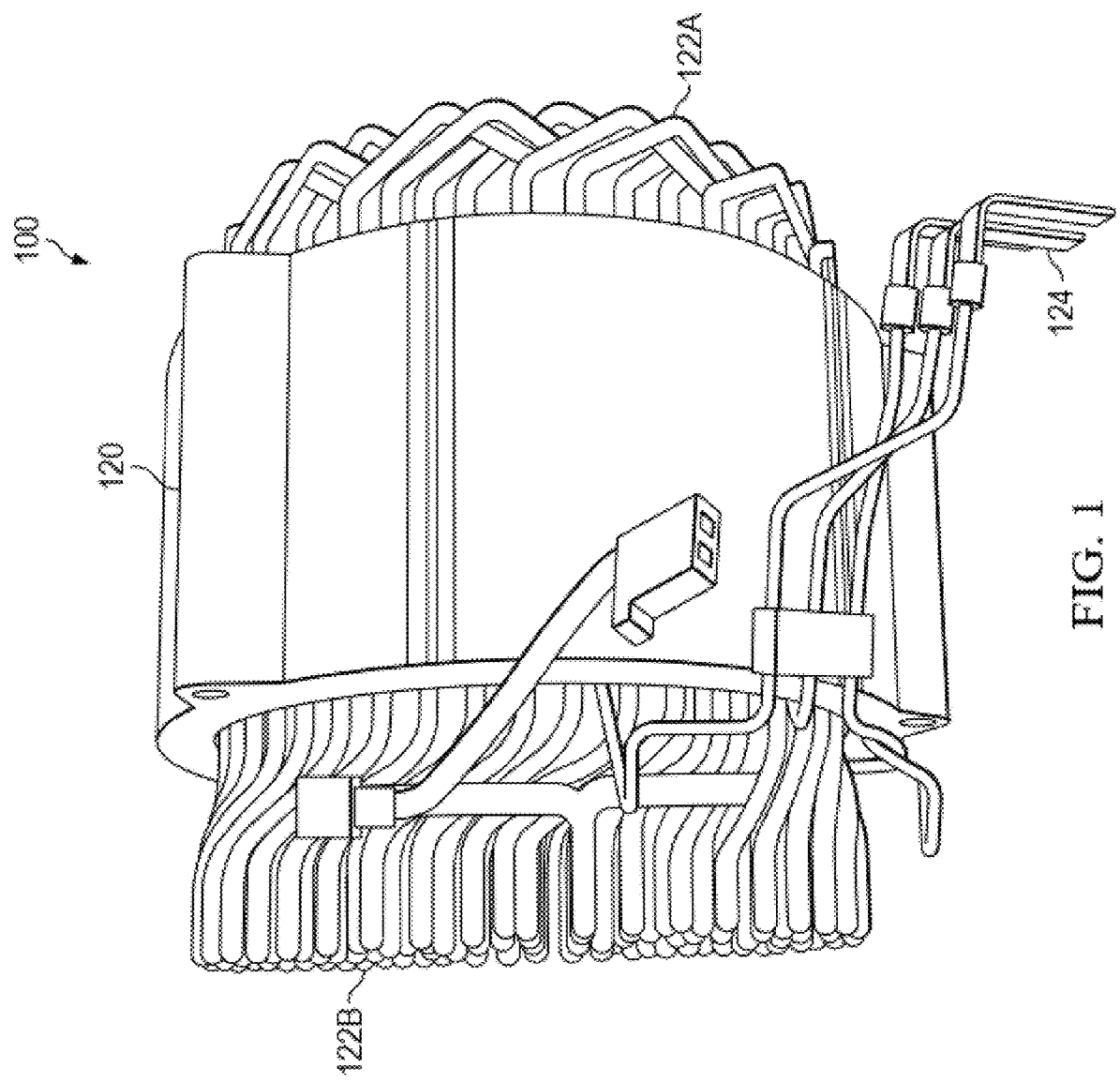
FIG. 1 illustrates the stator of a motor.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in a motor and motor drive system. The invention may also be applied, however, to a variety of other electrical machine and machine control systems, including generators, rectifiers, and inverters, and any combination thereof. Hereinafter, various embodiments will be explained in detail with reference to the accompanying drawings.

A squirrel-cage induction motor is used mainly as an example to illustrate the innovative aspects of the present disclosure, but the innovations disclosed in this disclosure can also be applied to other motor and generators.

The stator of a squirrel cage inductor motor comprises a plurality of windings embedded in a stator core, usually made of silicon steel laminates, ferrites, powder iron or other magnetic materials. The windings are organized into a plurality of phases arranged in pole pairs. Usually, the number of phases and the number of poles are fixed in a motor. Mao etc. disclosed a dynamically reconfigurable technology in U.S. Pat. Nos. 9,240,748, 9,490,740, 9,800, 193 etc. and US patent applications 20190058364, 20190058430, 20200204099 etc., which modifies the number of poles and number of phases of a motor through current control to optimize the motor design and motor performance across a wide operating range. The rotor of the squirrel cage induction motor comprises a rotor core and a squirrel cage made of metal bars which are inside the rotor core, usually comprising magnetic materials usually similar to the stator core's. A shaft is located usually in the middle of rotor and is surrounded by the metal bars and the rotor core to provide mechanical output to a load. First ends of the metal bars are shorted together by a first interconnect ring. Second ends of the metal bars are shorted together by a second interconnect ring. In operation, the electric power is usually applied to the stator, and sometimes to the rotor also. As a result, a first magnetic field is created in the stator and in the airgap, which rotates in time at a synchronous speed with alternating current (ac) power applied to the stator windings. The first magnetic field induces electric currents in the metal bars of the rotor. The induced currents produce a second magnetic field in the rotor and the airgap. According to Lenz's Law, the rotor follows the rotating first magnetic field and generates a mechanical torque pulling the rotor into rotation. In a motor mode, the rotor will fall behind the first magnetic field. The torque of the motor is approximately proportional to the slip between the speed of the first magnetic field—the synchronous speed and the speed of the rotor. The synchronous speed (in RPM) of the rotating magnetic field in a motor is equal to the frequency of the electric power supply times 60 and further divided by the number of pole pairs.

Motors are widely used in applications such as electric and hybrid vehicles, drones, ships, aircrafts and wind turbine generators. Power density/torque density, energy efficiency, size/weight and cost are usually conflicting objectives in a motor design. It would be desirable to have a motor system exhibiting a good performance such as high efficiency over a wide speed and power ranges at a low cost with reduced motor size. These and other problems are generally solved or circumvented, and technical advantages are generally achieved, by preferred embodiments of the present disclosure which provide a high efficiency motor or generator with multiple airgaps (rotors) and improved winding arrangements, at much higher power and torque density.

The control of the winding currents can be achieved through coupling a plurality of power converters to the windings of the motor. A suitable control algorithm is employed to control and improve the operation of the plurality of power converters in accordance with the operation condition. As a result, the motor and the associated motor drive system become a software defined system. The operation and performance of the software defined system can be improved over a wide range of operating conditions and with simulated and/or actual operation data through a self-learning and optimizing algorithm with real-time software update capability, thereby resulting in much better performance and cost tradeoffs. The benefits of the software defined system are especially significant for systems with complex operation modes such electrical vehicles. For example, the performance and function of the system can be modified or improved over time with regular or irregular update of the software used, through over-the-air (OTA) update, which can be offered as a service. In the update motor related parameters and motor control strategies can be modified. Such update may include improvement derived from a large body of data from small or big group of users, which can be stored, processed and managed in clouds.

In addition, the energy efficiency, reliability and the cost of a motor and/or motor control system can be improved simultaneously by applying the technology presented in this disclosure. For example, the system can continue to operate even though some windings in the motor, or some parts in a power converter are failed, as the failed parts or failed windings can be isolated and disabled with the rest of the system still working. It is also feasible to disable some power converters and/or some windings to make the system operate with a reduced number of phases to improve system efficiency at light load, similar to the phase-shading technique used in dc-dc converters.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a motor/generator with multiple airgaps and various innovative arrangements of stator windings, as well as stators, rotors and multiple airgaps between them, which may be also compatible with dynamical reconfiguration technology of motor/generator to exhibit good performance across a wide operating range. The motor will have much better power, torque and efficiency due to better space and material utilization with multiple airgaps inside it. Also, a dynamically reconfigurable induction motor (DRIM) system/technology for improving motors by dynamically changing the number of poles and/or the number of phases through various power electronics control mechanisms will also be discussed with the innovative arrangements. It should be noted that the general principles of the innovative aspects in this disclosure may be also applied to electric machines with a fixed number of poles and/or phases. There are different types of electric machines including induction machines, permanent magnets machines, switching reluctance machines, synchronous reluctance machines, and hybrid machines. The various embodiments in this disclosure are applicable to such machines and machine systems. For example, a stator may also have permanent magnets or other features to improve its operation. This disclosure presents further improvements in motor/generator design, control and manufacturing processes. Although the discussion uses a motor as an example, the same principles can be applicable to generators. Hereinafter, various embodiments will be explained in detail with reference to the accompanying drawings.

FIG. 1 illustrates a picture of the stator of a state-of-the-art motor 100, with the housing and other mechanical parts removed. The stator core 120 usually comprises silicon steel laminates, and sometimes ferrites, power iron or other magnetic-conducting materials. In addition to conduct and shape magnetic fields, it provides also mechanical support and cooling to windings embedded in the stator and the rotor around the stator. Usually, a plurality of slots is cut in the stator core 120 evenly along a perimeter facing an airgap. The portion of stator core between the slots are called tooth, and the portion of stator core outside the slots is called yoke and is labeled 106. A stator winding (which may have single or multiple turns) comprises a plurality of coils, each placed in two slots of the stator core 120. A coil usually is in an enclosed shape with end conductors (all end conductors are sometimes called end windings). Different coils belonging to the same phase and located in neighboring slots are usually connected in series to form a subphase winding, and different subphase windings belonging to the same phase may be connected in series or in parallel to form a phase winding. The active portion of the stator windings which contributes to the power/energy conversion is located inside the stator core 120 and thus cannot be seen in the picture. The inactive portion of the stator windings, which doesn't contribute to the energy transfer directly and only serves as a connection means for the active portion, is usually called end windings, and is shown as 122A and 122B. If the coils are pre-formed such as in hair-pin windings, end windings 122A are part of a coil and manufactured together, and 122B can be considered connection wires between different pre-formed coils. The output leads 124 connect the windings of the phases (phase windings) to appropriate power sources, such as coupled to a power converter or inverter. Usually, the end windings take about 50% of stator's length, i.e. about 50% of a conventional motor's stator volume has no contribution to torque generation directly. This is one of the major shortcomings to be overcome by the technologies presented in this disclosure.

Figure 2:
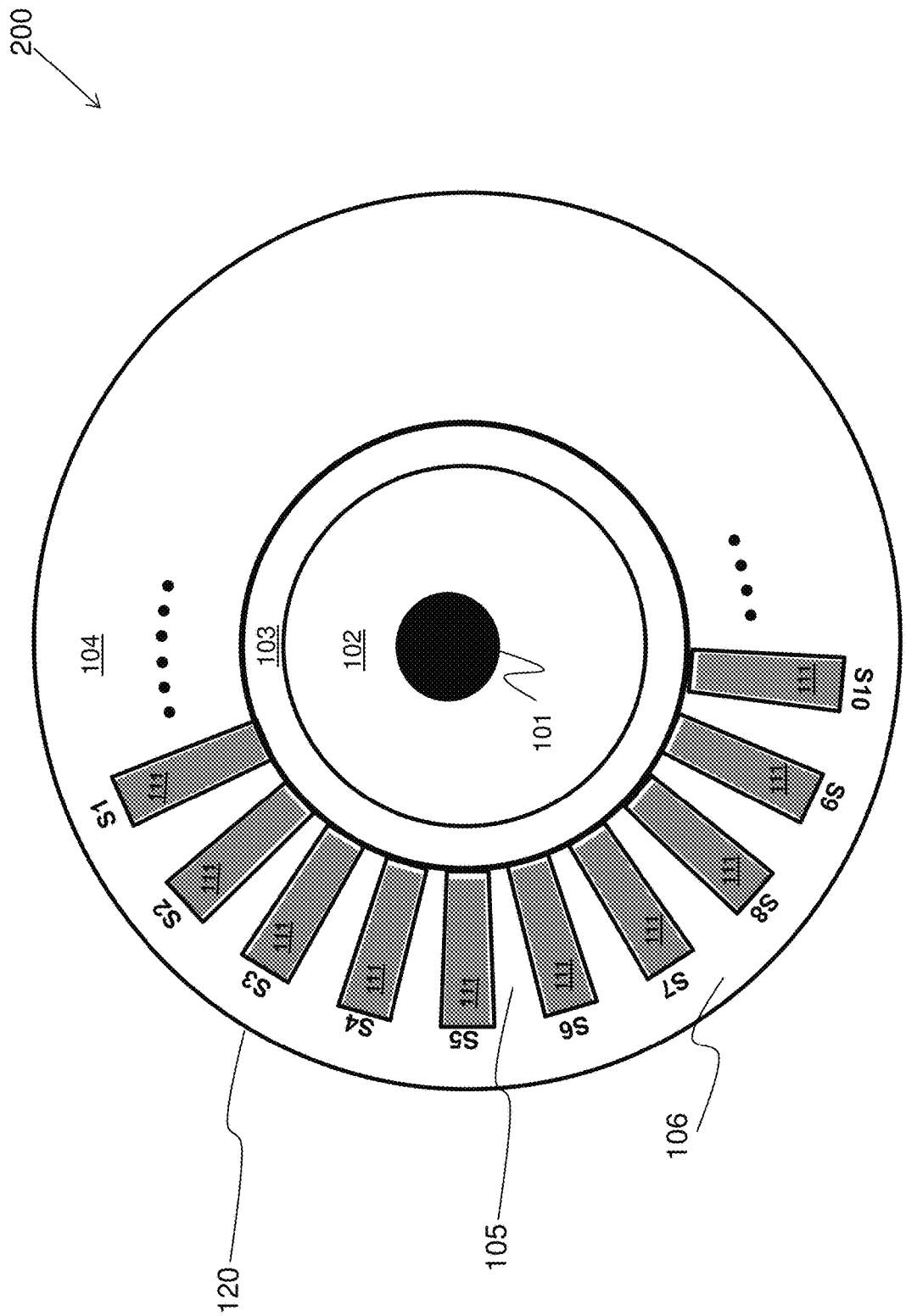
FIG. 2 illustrates a cross section view of a motor.

FIG. 2 is a cross section view of the motor shown in FIG. 1. The motor 200 shown in FIG. 2 comprises a stator 100 and a rotor 102 located inside and surrounded by the stator 100. An airgap 103 is located between the stator 100 and the rotor 102. The stator 100 comprises a stator core 120 with a plurality of stator slots designated as S1, S2, S3 etc. In each slot a plurality of electrical conductors (stator conductors) 111 is located within, and these stator conductors are organized into a plurality of stator windings. The plurality of stator slots/conductors is placed more or less evenly along an inner circumference of the stator core 120 facing the airgap 103. Again, as described above, multiple stator conductors may be made into a coil, and multiple coils may be connected into a subphase winding, and multiple subphase windings belonging to the same phase may be connected together to form a phase winding. The relationship of coils, subphase windings and phase windings are the same to all embodiments in this disclosure, and will not be repeated later. Depending on the construction of the motor, a phase winding (also referred to simply as a winding) may be located in the rotor also, although the following discussion will generally use such windings in the stator as examples. Please note that the slots are optional, i.e. the stator core may have a slotless construction. When there are indeed slots in the stator core (similarly in a rotor core), the stator core is divided into tooth area 105 and yoke area 106.

Each coil in FIG. 2 may have a positive segment and a negative segment, which are usually wounded along the circumference along the airgap 103. Also, toroidal coils are sometimes used (a toroidal coil is wound across the yoke area adjacent to the slots housing the coil). A shortcoming of these conventional coils is that the inactive portion of a coil is relatively long compared to the active portion. A dual rotor topology with toroidal coils may reduce the length of the inactive portion of a coil. However, such topology still suffers in two aspects: the coils have high cost, and the power loss of the motor is still relatively high because these toroidal coils form concentrated windings which causes high spatial harmonics in the airgap MMF (Magnetomotive Force) or flux.

Figure 3:
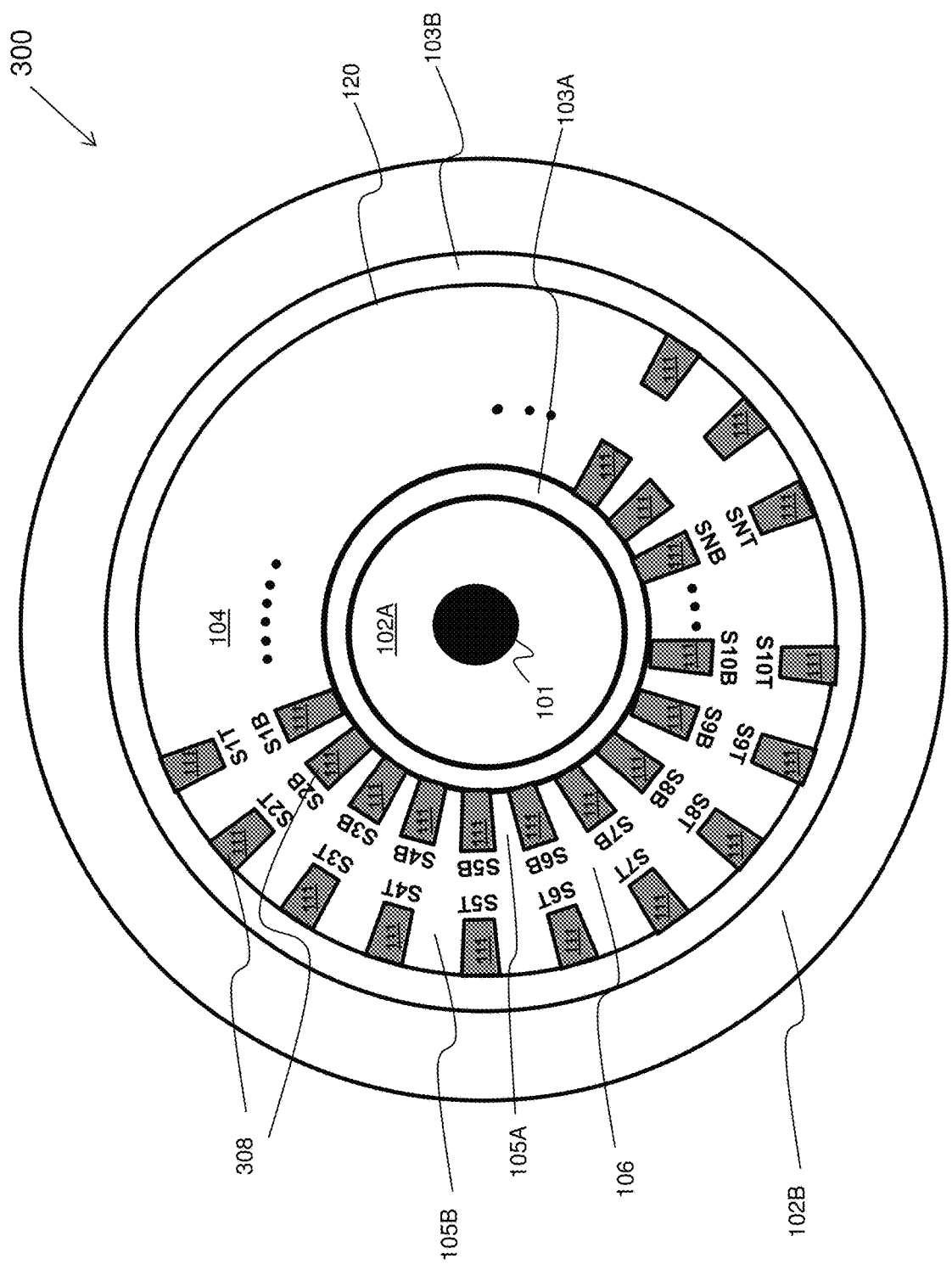
FIG. 3 illustrates a cross section view of a motor in accordance with various embodiments of the present disclosure.

FIG. 3 illustrates a simplified view of a high efficiency high density motor 300 with single stator and dual rotors in accordance with various embodiments of the present disclosure. The motor 300 has a cylinder-shaped stator 100 and two cylinder-shaped rotors 102A and 102B with two airgaps 103A and 103B between them. The stator 100 mainly comprises a stator core 120 and a plurality of windings 308 embedded into it. Looking from the cross section in FIG. 3, the stator core 120 has 2 surfaces, the inner surface facing airgap 103A and the outer surface facing airgap 103B. Two rotors 102A and 102B are both magnetically coupled to the stator, and the relative magnetic field strength through the magnetic coupling can be adjusted by the lengths of the two airgaps. FIG. 3 shows the cross section view of the motor cut through the stator core 120. The motor 300 comprises a first rotor 102A, a second rotor 102B, the stator core 120 and a plurality of stator windings 308 formed in the stator core 120. A stator winding 308 consists of a plurality of stator conductors 111, located inside multiple slots. The first airgap 103A with a length of g1 and the second airgap 103B with a length of g2 are shown as radial arrangements, but the disclosed technology also applies to motors and generators with axial airgaps (axial flux machines). The length of an airgap refers to the distance between the respective rotor and the stator core, i.e. g1 is the distance between 102A and 120, and g2 the distance between 102B and 120 in FIG. 3. A plurality of first slots (inner slots) designated S1B-S10B, etc. is formed in the stator core 120 along a perimeter and facing the first airgap 103A. Similarly, a plurality of second slots (outer slots) designated S1T-S10T, etc. is formed in the stator core 120 along a perimeter facing the second airgap 103B. The first slots may have a different shape or different size from the second slots, and the shapes of the slots may be used to help magnetic flux flowing around the slots more smoothly and more evenly. Each slot (e.g., slot S1B) is employed to accommodate a portion of a stator winding comprising one or more conductors (e.g., stator conductor 111). It should be noted that, depending on different designs, more than one stator windings may be embedded in one slot (i.e. the conductors in a slot may belong to different stator windings), and a winding in a slot may have single or multiple stator conductors. The conductors in a winding may be divided into a plurality of coils, and a coil generally comprises conductors in one of the first slots and a nearby second slot, preferably in a slot pair with two directly opposite slots such as S1B and S1T, or S2B and S2B to reduce the length of the end windings. Alternatively, the two slots in a pair such as S1B and S2B may not be directly opposite to each other, and may have an angular offset between them circumferentially. Please also note that in this disclosure, windings and state windings, conductors and state conductors are used interchangeably. Also, the terms of windings and coils are sometimes used interchangeably, as they both refer to a configuration of conductors to produce a voltage, power or torque in a motor.

The tooth areas in FIG. 3 are divided into first tooth areas 105A which are coupled to first airgap 103A and second tooth areas 105B which are coupled to second airgap 103B. In essence, the motor can be viewed as two submotors in parallel: the first submotor formed by the first tooth areas 105A, the first slots (and conductors in them) S1B, S2B . . . , the first airgap 103A and the first rotor 102A, and the second submotor comprising the second tooth areas 105B, the second slots (and conductors in them) S1T, S2T . . . , the second airgap 103B and the second rotor 102B. The first submotor and the second submotor have a common yoke. If the first rotor and the second rotor are not mechanically coupled together, they can have different characteristics as they can have different outputs. If the first rotor is mechanically coupled to the second rotor, their mechanical speeds are synchronized and thus care has to be taken to make sure that their torque outputs are in the same direction in an operation mode so they can add up. With proper arrangements, the currents of the conductors in the first slots and in the second slots may be configured such that the magnetic fields in the first airgap 103A and the second airgap 103B have the same angular speed and direction. In this way, the first submotor and the second submotor can generate torques in the same direction in an operation mode. The two submotors can be configured to have similar electro-magnetic characteristics, for example they may have approximately the same (e.g. within 20% difference) key parameters of speed-torque curves, but may produce different amount of torque in an operation mode. For example, the outer rotor has more airgap area, and thus may be designed to produce higher torque than the inner rotor. The airgap length g1 and g2 can be designed to have different values according to system needs, and such values can be configured to adjust the relative strength of magnetic flux in, and thus the relative power and torque split between, the first submotor and the second submotor (i.e. between the first rotor and the second rotor). There are many ways to achieve this. For example, the currents of conductors in the first slots can be arranged to have the same amplitude, frequency and angles as the currents of conductors in the corresponding second slots. If the conductors in first slots and second slots form different windings, this can be achieved through proper control of winding currents. If each coil of stator windings is wound or formed with one edge (conductor) embedded in a first slot and another edge (conductor) embedded in a second slot, this can be achieved naturally. In this case, the stator coils are arranged radially, and form radial windings. The following discussion will use this radial winding configuration as examples. Also, the rotors mechanically coupled together should be configured to have similar electro-magnetic characteristics (for example, reaching their respective maximum torques at approximately the same slip frequency if induction rotors are used, or have approximately the same ratios of d-axis inductance over q-axis inductance if synchronous rotors are used), so one set of control for the stator winding currents will achieve good performance in all submotors, and in all operation modes the output torques of all rotors should be in synchronization or additive with an almost constant ratio, to make electric, magnetic, mechanical and thermal stresses on all rotors similar. For example, if induction rotors are used, then the inductance and resistance in all rotors should be designed to make all rotors to have the same or approximately the same max-torque slip for given operation modes. If the torque in each rotor has significant ripple such as in switching reluctance machines, synchronous reluctance machines and IPM machines, the rotors may have similar shape, but main features related to reluctance, such as position of poles or teeth, are shifted with certain mechanical angles, so the pulsating torque components in different rotors may be smoothed out to reduce the ripple in the total output torque. Similarly, the first slots and second slots (teeth between them) may have an angular shift (i.e. have an angle offset along the circumference) so the tooth-slot effect on the stator currents and the output torque in the two submotors may have a proper phase shift so the combined effect can be significantly reduced.

It should be recognized that while FIG. 3 illustrates the motor system 300 with few slots and stator windings, the motor system 300 could accommodate any number of slots and stator windings. The slots are generally evenly distributed along a perimeter of the motor, and are labeled consecutively. Throughout the description in the present disclosure, a slot and the coil(s) in it have the same designation. For example, S5B refers to the 5th first slot, S5T refers the 5th second slot, and S5 may refer to a coil embedded in the slot pair S5B and S5T. When there are multiple coils in a slot pair, a numerical suffix may be added to the coil number with a dash sign between. For example, S1-2 means the second coil in the slot pair S1B and S1T. Please note that slots and tooth here are more relevant to the relative locations of the conductors and coils associated with them, and tooth or slots themselves are optional. Innovations in this disclosure may also be applied to motors and generators in slotless constructions.

The two rotors 102A and 102B may each have a mechanical output port and produce a mechanical output torque. A shaft 101 is shown in the center of the first rotor 102A which can be used to couple the mechanical torque of the first rotor to an output port of the motor or as an output port of the motor. Similarly, the second rotor 102B may be coupled to a mechanical output port of the motor, for example a wheel, a propeller, a gear or other mechanical device which can transfer mechanical power and torque. Please note that in a multi-rotor configuration presented throughout this disclosure, the mechanical output ports of multiple rotors such as 102A and 102B may be separate, or may be combined or coupled together into one output port. In case the outputs of multiple rotors are combined into one output port, these rotors have to be either all asynchronous (induction) type, or all synchronous type. Uncoupled rotors may have different types. Various rotor topologies can be used. Examples of synchronous types include various PM rotors, switching or synchronous reluctance rotors, wound synchronous rotors, etc. Examples of asynchronous types include various induction rotors, both squirrel-caged and wound. The innovation in this disclosure can be applied to all rotor types or stator types, so this disclosure will focus on only the innovative aspects of the motor and motor systems, and other details are omitted for the sake of conciseness. If needed, a mechanical housing may be put outside the second rotor 102B for protection, cooling and mechanical support, but each technology discussed in this disclosure also works without external mechanical housing, which can be used in drones, aircrafts, vehicles, and boats to directly propel the load, such as in in-wheel drive systems for EVs.

Figure 4:
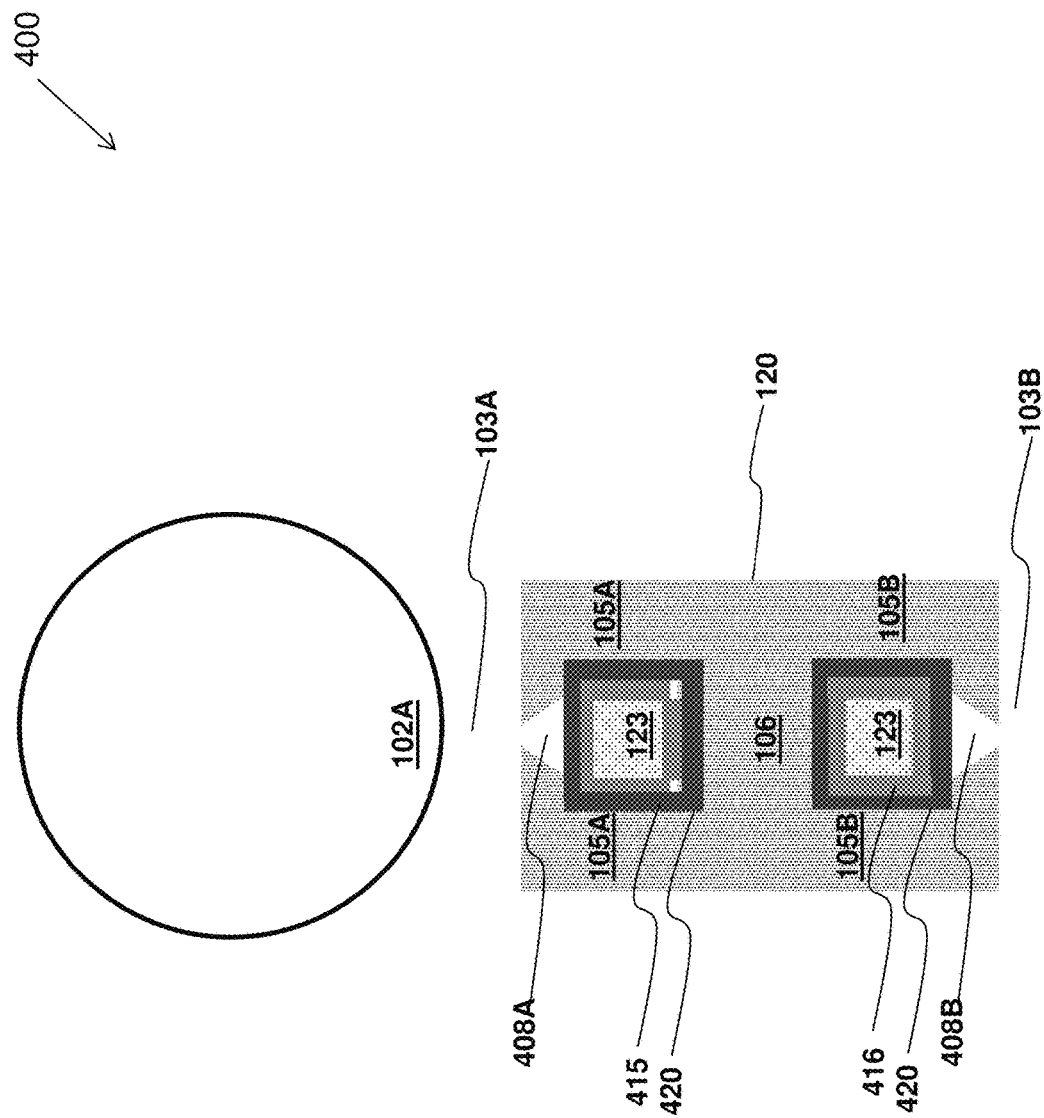
FIG. 4 illustrates a simplified view of a coil in accordance with various embodiments of the present disclosure.

FIG. 4 further illustrates details of a coil in a pair of slots in accordance with various embodiments of the present disclosure. FIG. 4 is a simplified enlarged view of an area around a stator slot pair in FIG. 2. A region 106 is a portion of the stator core called a yoke. In a cylinder stator, the yoke area 106 forms a circular strip. In the figure two slots, first slot 415 and second slot 416, are shown, and they form a slot pair. A first tooth area 105A and a second tooth area 105B are formed on the two sides of the yoke strip 106 by cutting out the slot pair 415 and 416 on the stator core 120. The yoke 106 and the teeth 105A, 105B form the core 120 of the stator. The core is made of a magnetic material such as a silicon steel laminate, a ferrite, an iron powder or a magnetic compound through a process such as punching, cutting, milling, casting, molding, printing, plating, pressing, baking, depositing etc. A first slot 415 is formed between the yoke region 106 and first airgap 103A. Similarly, a second slot 416 is formed between the toke region 106 and second airgap 103B. The walls of a slot may have an insulation layer 420 to withstand a relatively high voltage. A slot may be closed, or may have an opening 408. The opening 408 reduces the leakage inductance of the winding/windings embedded in the slot. The opening 408 may be empty, or filled a with mechanical support material, which may or may not be a magnetic-conducting or electric-conducting material. In some embodiments, suitable materials such as solder paste may be put into the slot or opening 408. After a reflowing or other soldering process, the solder paste forms a cap to further secure the position of the conductors in the slot.

Stator conductors (111 in FIG. 3) can be put into slots 415 and 416, and stator conductors in an inner slot (first slot) and a nearby outer slot (second slot) can form a (or multiple if needed) coil 123. That is, the coil 123 (and thus the winding it is a part of) is arranged radially, and can be called a radial coil/winding. The stator coil 123 can have a single turn or multi turns, and may be placed in one or more layers in the slots. There may be an insulation layer 420 between the different conductors, between different layers, or between a conductor and the core of the stator if the conductor needs to withstand a relatively high voltage.

As shown in FIG. 4, the stator 100 and the rotor 102A are separated by the airgap 103A. For brevity, only one stator coil 123 in each slot has been illustrated in FIG. 4. A person skilled in the art would understand a slot may accommodate a plurality of stator coils. The plurality of stator coils may be electrically connected to each other. In the manufacturing process, a stator conductor may be inserted into a slot of a motor as a component. Alternatively, stator conductor may be manufactured into the slot through suitable processes such as molding, casting, plating or printing processes using a conductive material, separately (consequentially) or together with other stator conductors (simultaneously). A stator coil may be wound with suitable magnetic wires, or formed by mechanically connecting stator conductors in different slots, or pre-formed into an appropriate shape through bending, punching, stamping, cutting, etching, casting, molding, printing or other suitable process.

FIG. 5 illustrates a simplified view of a stator conductor/coil 123 in accordance with various embodiments of the present disclosure. The stator coil 123 comprises a metal bar 502, and optionally an insulation layer 504 may be over portion of the metal bar 502. The metal bar 502 may be formed of any suitable conductive materials such as aluminum, steel, copper, any combinations thereof and the like. Although a rectangular cross section is shown, it can be of any shape which can fit the cross section of the slot. Also, a straight bar was shown, but it may be shaped in any suitable form or shape to fit the slots it will be embedded into. Cooling apparatus, such as cooling channels, thermal pipes or cooling fans, may be attached to a stator coil. As an example, in FIG. 5 the round shape 506 inside the winding illustrates a cooling feature, which can be a thermal pipe, a hole to be filled with cooling liquid, or a pipe filled with cooling liquid etc. Of course, cooling features may be applied to the stator or rotor core if needed.

There may be a variety of processes to form the insulation layer 504 with a suitable insulation material. In some embodiments, in order to increase the voltage-standing ability of the stator coil 123, part of the stator coil 123 located inside the stator core may be coated or covered with suitable insulation materials such as insulation paper, film, epoxy or paint. In some embodiments, an oxidation process is applied to the metal bar and an oxidized layer is formed. The oxidized layer with appropriate thickness is an insulation layer. During the oxidation process, the areas to be used for the electrical connection may not be oxidized. Through suitable oxidation processes, around the surface of the metal bar a suitable oxidized layer can be formed to stand a voltage high enough for the intended application.

The insulation layer may also provide a good thermal conduction path so that heat can be transferred between the stator windings and the magnetic material adjacent to the stator windings. It should be noted that, depending on different applications and design needs, the conductors of a winding in a slot can be casted, molded, or otherwise fabricated as a single piece. Or all the conductors of windings in a motor can be fabricated at the same time, for example casted into slots of the stator core simultaneously.

Figure 6:
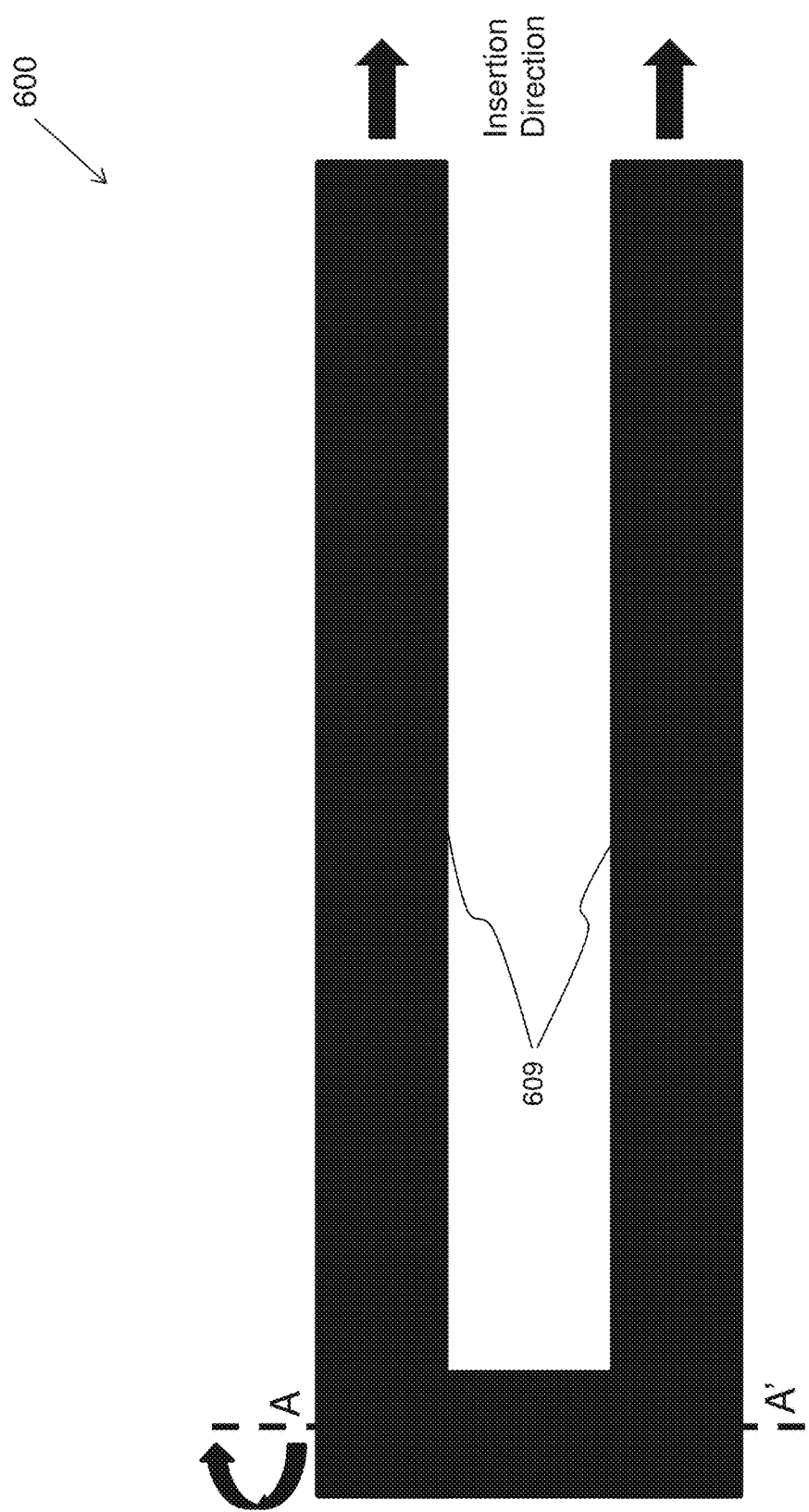
FIG. 6 illustrates a simplified view of a coil structure in accordance with various embodiments of the present disclosure.

FIG. 6 illustrates a simplified view of a single turn coil structure in accordance with various embodiments of the present disclosure. The two long edges 609 of the structure are meant to be placed inside a first slot and a second slot. The end portion (the A-A' edge) of the structure may be bended over along the line A-A' to reduce the required space. The bended portion may be mechanically attached to the main body of the coil to allow better current conduction. The shape of the coil as well as the shape of its cross section can be designed properly for performance, cost or any other purpose. An advantage of the open-end shape in FIG. 6 is that the coil can be inserted into the core easily in the direction shown to reduce the manufacturing complexity and cost. The shape of the ends of the coil may be smoothed to allow better insertion into the slots. The structure in FIG. 6 may be pre-formed altogether to save manufacturing cost. As an alternative, the end portion of the coil may be a separate part, and attached to the long edges through various soldering, bonding or welding techniques. Multiple coil structures may be connected in series or in parallel in a motor to form multi-turn coils/windings or conduct higher currents.

Figure 7:
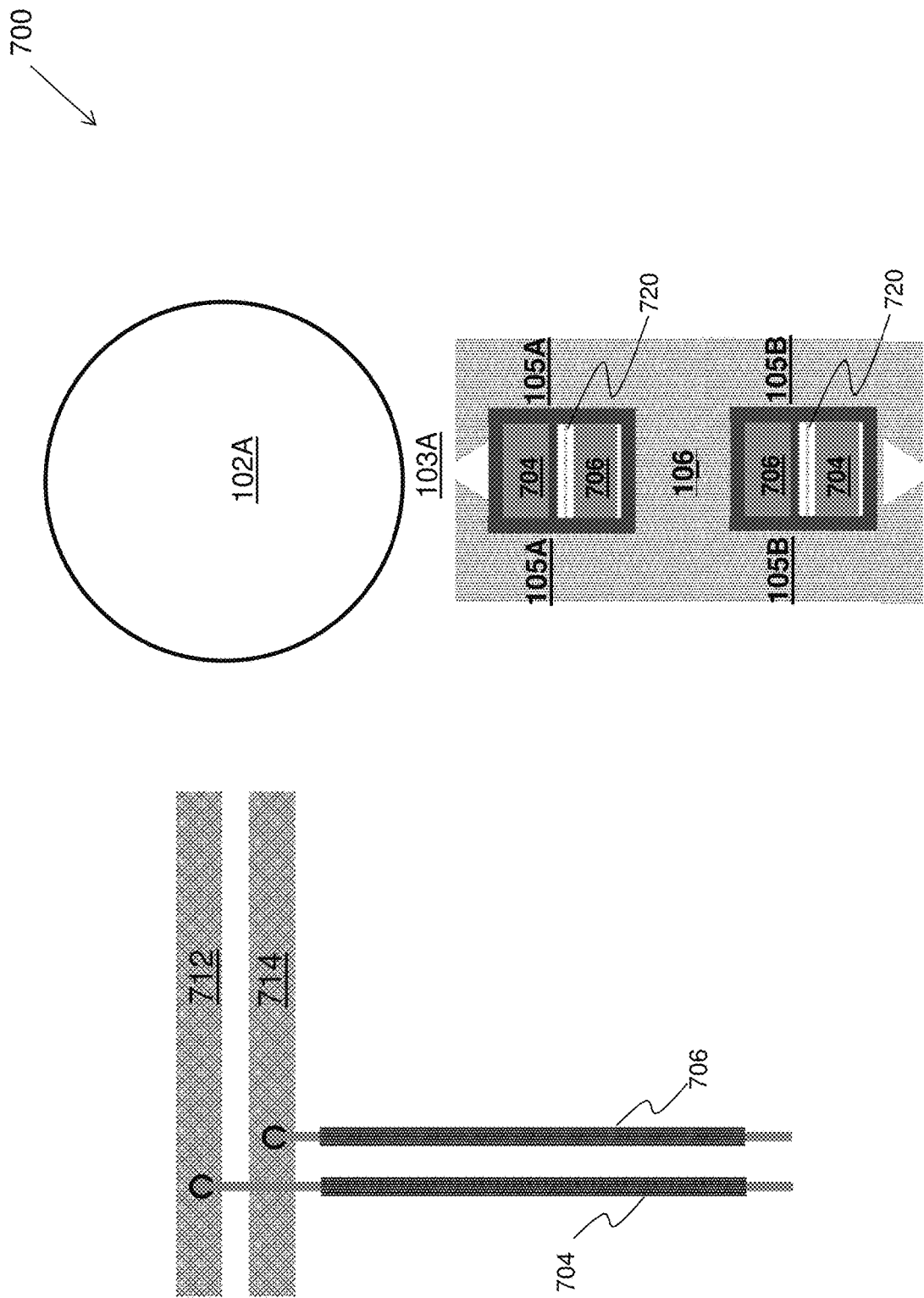
FIG. 7 illustrates an arrangement of multiple windings in a pair of slots in a motor in accordance with various embodiments of the present disclosure.

Multiple stator coils may be placed in a slot pair. FIG. 7 illustrates a cross sectional view of an area adjacent to a slot pair in which two stator coils 704 and 706 are located. One of the coils is placed on top of the other in accordance with various embodiments of the present disclosure. The multiple coils in a slot may belong to the same phase of the motor, or may belong to different phases of the motor. There may be an insulation layer 720 between them to withstand a high voltage if needed. FIG. 7 shows the two stator coils 704 and 706 are connected to different electrical nets, and thus may belong to different phases. The stator coils 704 and 706 may have the same or different construction, for example have different number of turns or different cross areas.

FIG. 8 shows an implementation similar to FIG. 7, but the stator coils 804 and 806 in the slot pair are arranged horizontally.

Figure 9:
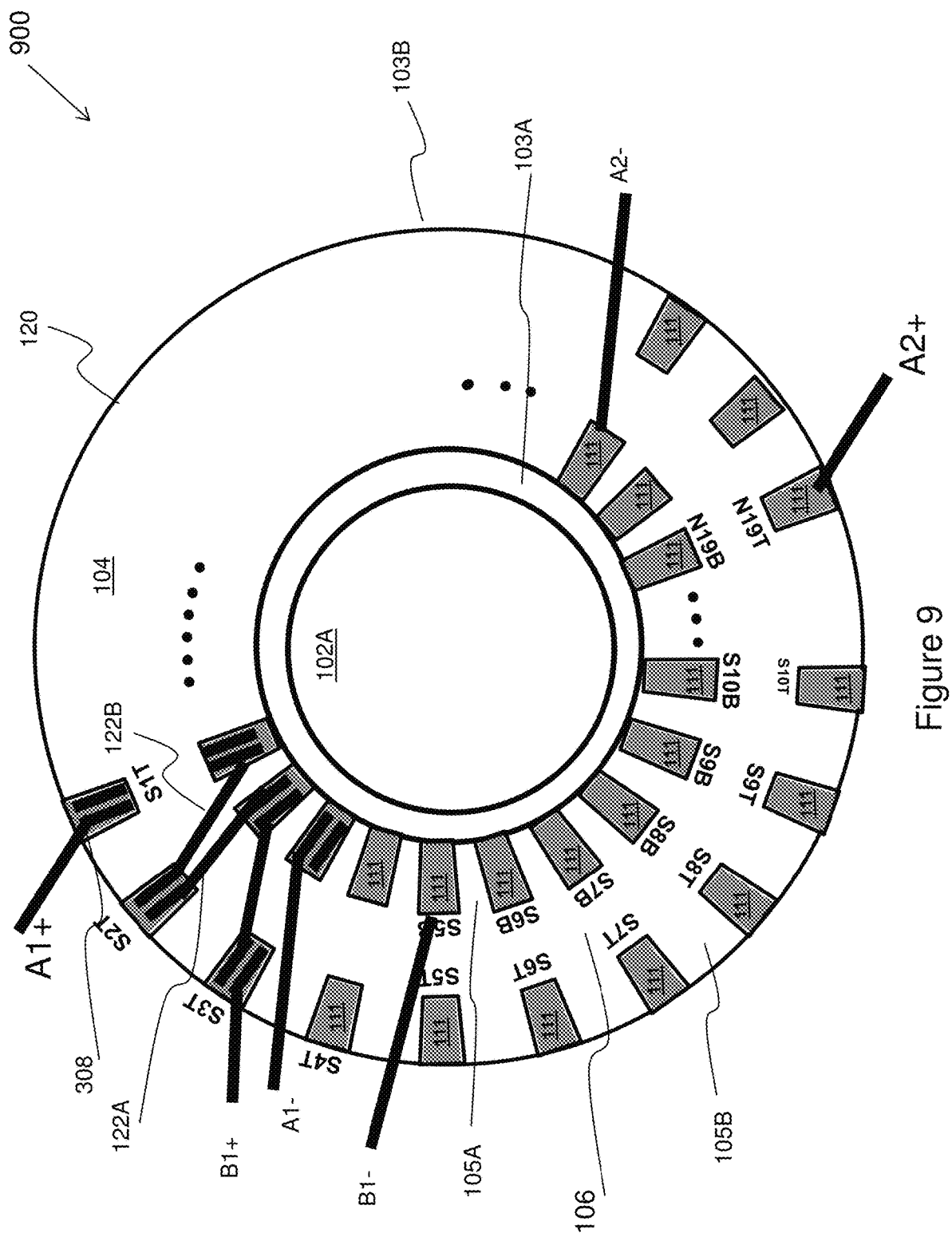
FIG. 9 illustrates a perspective view of stator winding connection of a motor in accordance with various embodiments of the present disclosure.

FIG. 9 shows a view of one end of the motor shown in FIG. 3 illustrating the interconnection of coils and/or windings. As an example, each slot contains 2 horizontally arranged coils. When needed, an in-slot connection connect 122A may connect coils in the same slot pair, in series or in parallel, with series connection shown as an example. When needed, an inter-slot connection 122B can connect coils in different slot pairs, in series or in parallel, with series connection shown as an example. In this drawing, two coils (or windings) were shown in each slot pair. S1 and S3 have windings (i.e. coils) belong to Phase A and another phase, and thus can be called partial-phase slots (i.e. windings or coils belonging to a phase winding just occupies part of the slot). The windings/coils in S2 all belongs to Phase A, thus are called a full-phase slot (i.e. windings or coils belonging to a phase winding occupies the whole slot). The coils (or windings) located in S1 through S3 and belonging to Phase A are connected in series here to form a subphase winding A1 (with leads shown as A1+ and A1−). There may be multiple full slots and multiple partial slots in a subphase winding. In an ideal situation, the subphase windings belonging to all phases in the motor spread around stator 100, usually evenly and symmetrically. A proper arrangement of partial slots between different subphase windings may create smooth transition of MMF in an airgap along the airgap perimeter, and allow the magnetic field in the airgaps (103A and 103B in this case) to have a more smooth and better sinusoidal distribution spatially, thus reducing power losses, vibration, and noise in the motor. Considering the stator windings have very short end portion, the space utilization of the motor is further improved, and thus resulting in a high-performance, high efficiency, high power/torque density motor.

The subphase windings belonging to the same phase can be connected in a good way to further enhance the performance of the motor. One particular consideration for choice of connection type is to overcome the effects of uneven airgap length along the perimeters of the rotors, which may be caused by mechanical vibration or defection in design or manufacturing, such as bending or other form of deformation of the rotor or the stator. In FIG. 9, another subphase winding A2 (with leads of A2+ and A2−) of Phase A which is about 180° apart mechanically from the subphase winding A1 is illustrated. As subphase windings A1 and A2 are mechanically 180° apart, some mechanical defects will have opposite effects. Therefore, the connection of A1 and A2 should be arranged to balance such effects in the overall performance of the motor, especially forming a smooth and roughly even magnetic field in the airgaps. For example, if the torque-generating magnetic field is generated mostly by permanent magnets (such as in various PM machines), A1 and A2 should be put in series to force the currents in them to be equal. If the torque-generating magnetic field is generated mostly by winding currents such as in induction machines or switching reluctance machines, it is better to connect A1 and A2 in parallel so the magnetic field strength in the airgap around A1 and A2 will be similar. Also, if the number of pole pairs of the motor is odd, the current in A1 and A2 will have opposite polarity, and the A1 and A2 should have reverse connection, for example A1+ should be connected or coupled to A2−, or A1− should be connected or coupled to A2−. In case all subphase windings are treated as phase windings (i.e. each phase has only 1 subphase winding), the control of the windings 180° apart mechanically can be configured according to how the magnetic field is generated, to cause the winding voltages or the winding currents to be approximately the same in order to develop a smooth magnetic field distribution in the airgaps.

Figure 10:
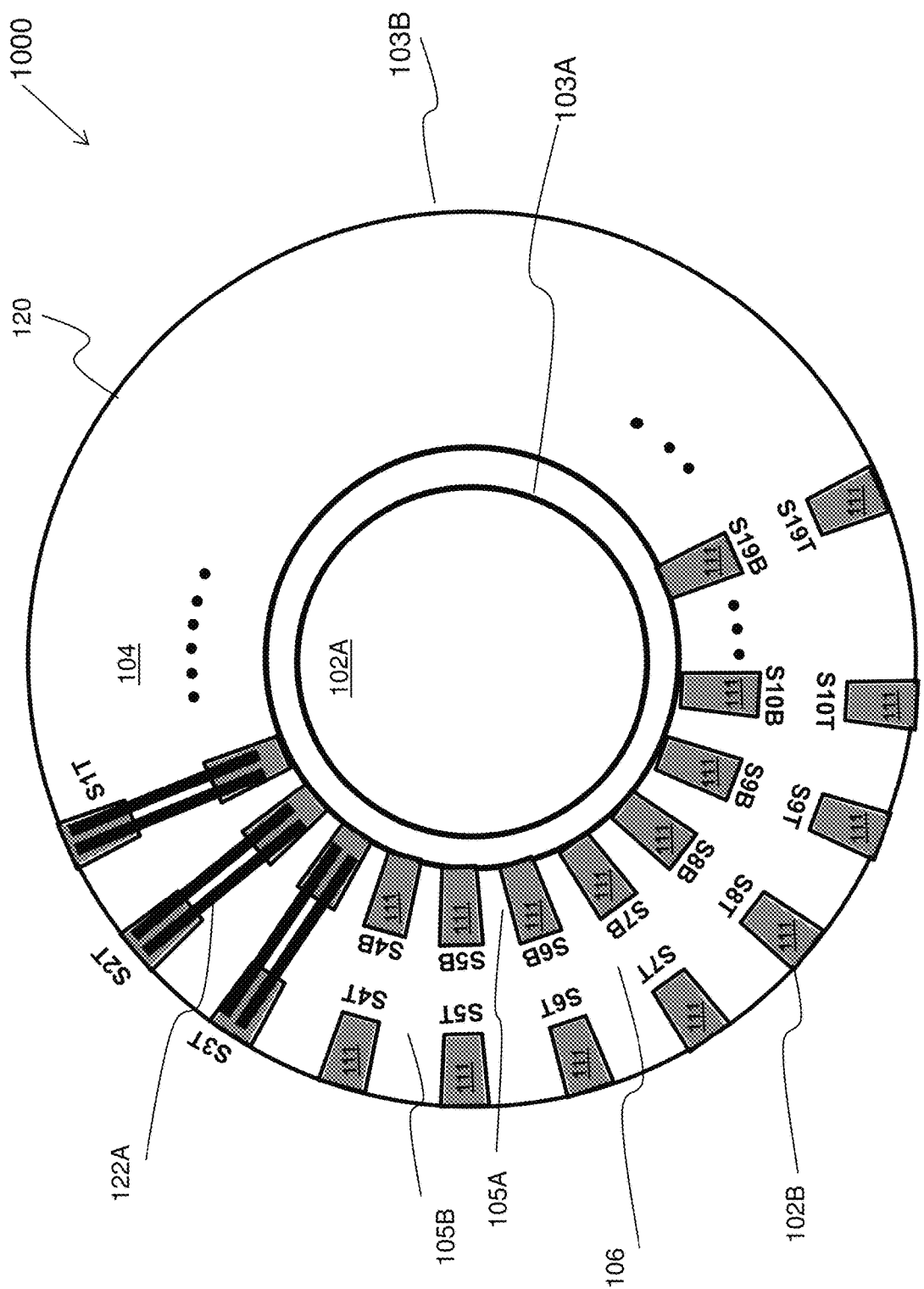
FIG. 10 illustrates another perspective view of stator winding connection of a motor in accordance with various embodiments of the present disclosure.

FIG. 10 illustrates a simplified view of the other end of stator 100. The in-slot connection 122A shown in the figure may be the end portion of windings, for example the portion along the line A-A' in FIG. 6.

FIG. 11 shows an exemplary winding (coil) arrangement of a 36 slot motor in accordance with various embodiments of the present disclosure. Designators S1, S2 etc. represent slot pairs. For example, S1 represents both S1B and S1T. As an example, there are two coils in each slot (or each slot pair), which may belong to the same phase or different phases. FIG. 11 shows nine phases labeled from A through I, with Section 2 repeating assignments of phases (i.e. the association of slots to phases) same as or similar to Section 1. In actual design, number of phases can be changed according to design objectives. It is also feasible to have different phase-slot assignment in Section 1 and Section 2 so the motor may have 18 phases with a similar arrangement. Higher number of phases may be desirable when the motor has high power rating. Also, the arrangement of the coils and slots can be repeated to have more slots and/or phases. In each subphase winding, there is a full-phase slot (for example, S2 for Phase A), and 2 partial-phase slots (for example, S1 and S3 for Phase A). In this way, a phase winding may start with a partial slot both directions along the perimeter in space. One advantageous feature of having such an arrangement is the space harmonics in the airgaps may be reduced because each winding starts and ends with a partial slot in space and the spatial distribution of the magnetic field in the airgaps is relatively smooth. It is also feasible to have more or less full slots or partial slots in each subphase winding. When more than one partial slot are used between full slots assigned to adjacent phases, the number of turns of the coil/winding belonging to a phase may decrease or increase linearly or sinusoidally in these partial slots, to make the flux distribution in the airgaps smoother without reduced spatial harmonics. Of course, it is also possible that a subphase winding starts with a full slot in one or both direction if needed.

Figure 12:
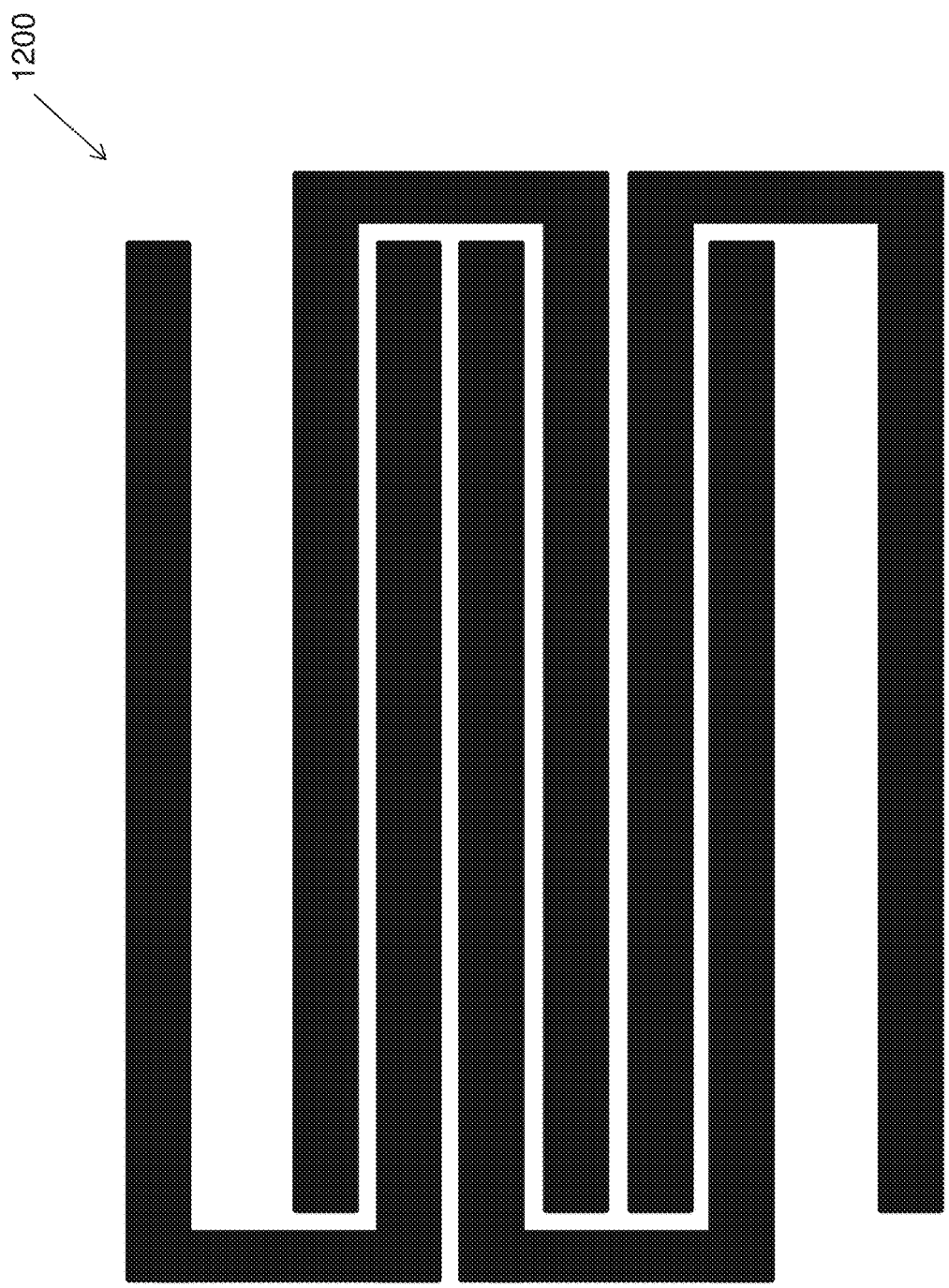
FIG. 12 illustrates a perspective view of arranging multiple coil structures into a pattern in accordance with various embodiments of the present disclosure.

It should be noted that depending on different applications and design needs, the winding arrangement may vary accordingly. A coil can be wound or pre-formed as discussed before. When pre-formed coils are used, it is advantageous to align multiple coils into a suitable pattern and manufacture them together to reduce manufacturing cost and maintain good manufacturing consistency. FIG. 12 shows an example pattern based on the coil shape in FIG. 6. Different shapes of coils or different patterns can be used. One or more patterns may be manufactured in batch with punching, stamping, cutting, casting, molding, etching, plating, printing or other suitable process.

Figure 13:
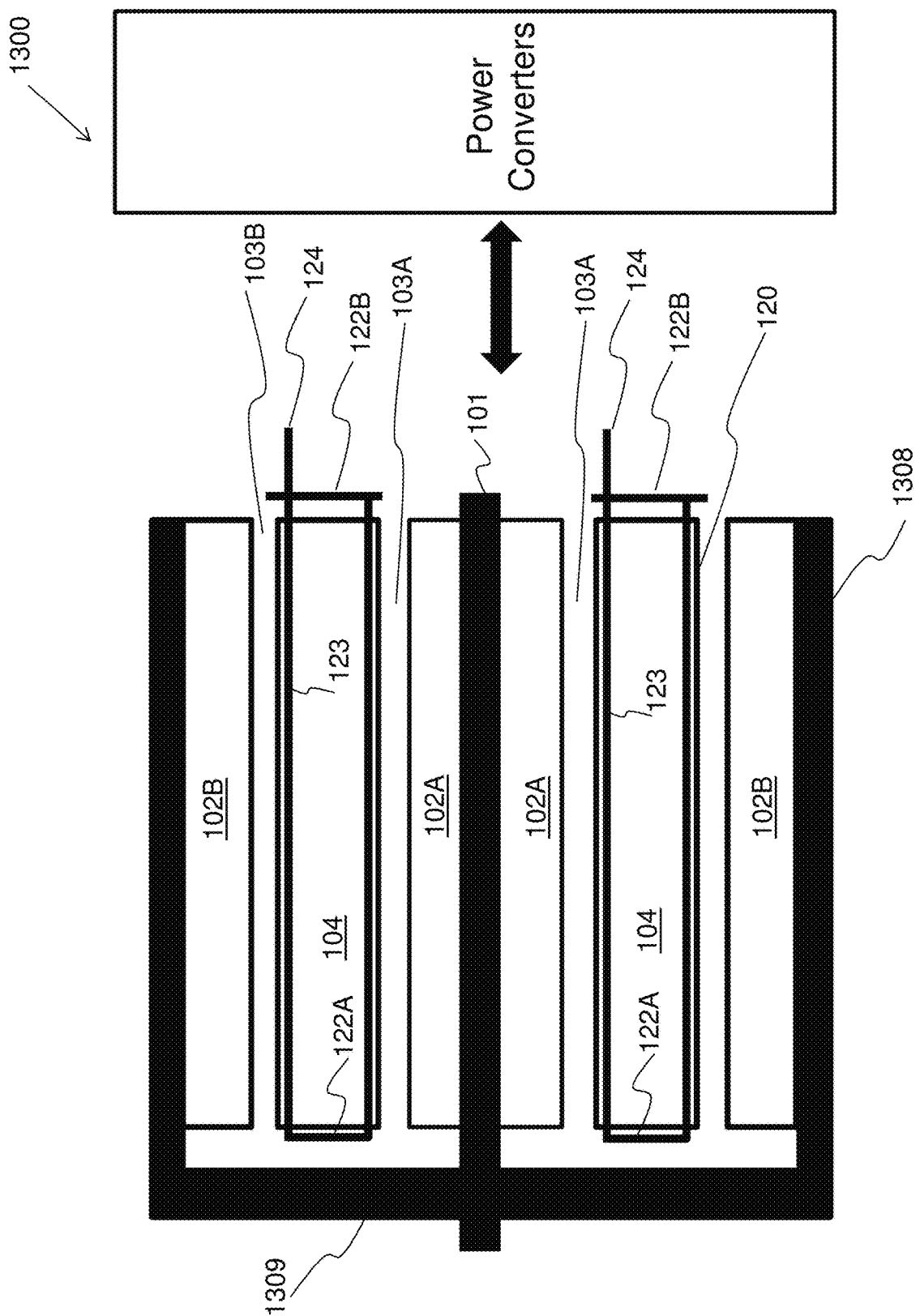
FIG. 13 illustrates a motor drive system in accordance with various embodiments of the present disclosure.

FIG. 13 shows an illustration of a simplified cross section view of a motor cut in longitude orientation in accordance with various embodiments of the present disclosure. Here suitable power converters, such as inverters or dc-dc converters are coupled to the power leads 124 at one end of the stator 100, and at the other end a mechanical coupling device 1309 couples the mechanical torque on mechanical support 1308 (generated by the second rotor 102B) to the mechanical shaft 101, which is the mechanical output port of the first rotor 102A. The mechanical coupling 1309 may be a direct mechanical connection as is shown, or suitable mechanical devices such as gears. In this way, the mechanical outputs of multiple rotors can be combined together. The mechanical coupling device 1309 is optional, and the first rotor 102A and second rotor 102B may have separate output ports. The power converters may be integrated inside the same housing/body of the motor, or be located in a separate housing. Suitable control is utilized to achieve good performance of the system. Particularly, advanced technique, such as dynamically reconfigurable control with its winding arrangement (DR Technology), disclosed in U.S. Pat. Nos. 9,240,748, 9,490,740, 9,800,193 etc. and US patent applications 20190058364, 20190058430, 20200204099 etc., can be used to further improve the system performance, because with the DR technology, the yoke of the stator and the length of the end windings with the winding arrangement in this disclosure, can be significantly reduced, leading to greatly reduced size, weight and cost of the motor, it is of particular interest to use it in combination with the technology discussed above.

Figure 14:
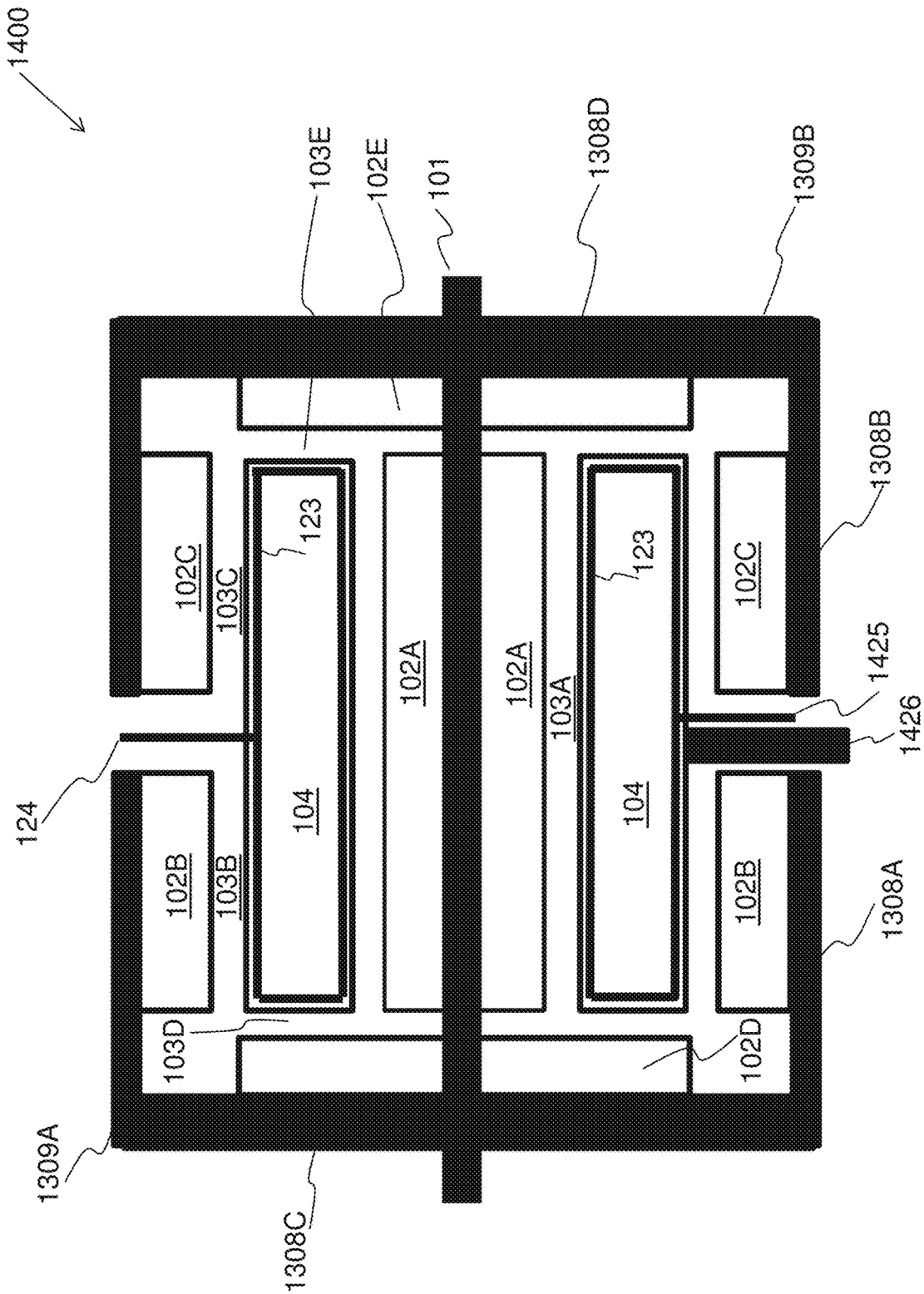
FIG. 14 illustrates a configuration of a motor with two sections in accordance with various embodiments of the present disclosure.

The configuration in FIG. 13 can be used as a building block to expand the motor along the shaft or radially. FIG. 14 shows an exemplary implementation of expansion in axial direction in accordance with various embodiments of the present disclosure. FIG. 14 shows that two motors with similar configuration as the one shown in FIG. 13 are combined or integrated into one. Please note that the stators and first rotors of both configurations are combined into 1 set, i.e. inner rotor 102A and stator 100. The stator winding 123 may extend through the whole stator. Alternative, the stators or first rotors of the two configurations may be kept separated if wanted. The second rotors 102B and 102C are shown as separate, with airgaps 103B and 103C separating them from the stator 100. The power leads 124 are now located in the center region which is located between the two original configurations. The connection between stator windings and subphase windings 1425 can also be arranged in the center portion. Block 1226 represents additional features, such as cooling, mechanical support, sensing, and power converters. All of these, or some of these, can also be located in the center region.

To utilize fully the space inside the motor to generate more torque and power, one or two axial submotors may be incorporated at an end or both ends of a motor. In FIG. 14, axial rotors 102D and 102E are added. Of course, each of these axial rotors is optional, and should be added only when needed. They can produce more torque output to mechanical supports 1308C and 1308D. The stator windings corresponding to rotor 102D are actual the left-side end winding of stator windings 123, coupled through airgap 103D. The stator windings corresponding to rotor 102E are the right-side end winding of stator windings 123, coupled through airgap 103E. The end portion of stator 100's core may be an added magnetic structure similar to the stator core of an axial flux machine, which may have or may not have tooth. The pattern of the stator windings for the axial rotors 102D and 102E are same as the end windings shown in FIG. 10, and the rotors 102D and 102E can be configured and designed accordingly. The magnetic fields in airgaps 103D and 103E are configured to have the same synchronous speed and direction as the magnetic fields in airgap 103A, 103B, and 103C, and thus rotors 102D and 102E can contribute significant torque and power to the motor, when the motor diameter is significant compared to its length.

The outputs of some or all the rotors in FIG. 14 can be coupled through optional mechanical coupling devices 1309A and/or 1309B. These mechanically coupled rotors have to be all of synchronous type or asynchronous type. However, different synchronous topologies, such as switching reluctance, synchronous reluctance, IPM, SPM, and wound synchronous etc. can be mixed and used in combination. Similarly, different asynchronous topologies, such as squirrel-cage induction and wound induction, can be mixed and used in combination. The mixed use of different rotor technologies allows better customization of motor performance according to system needs.

Figure 15:
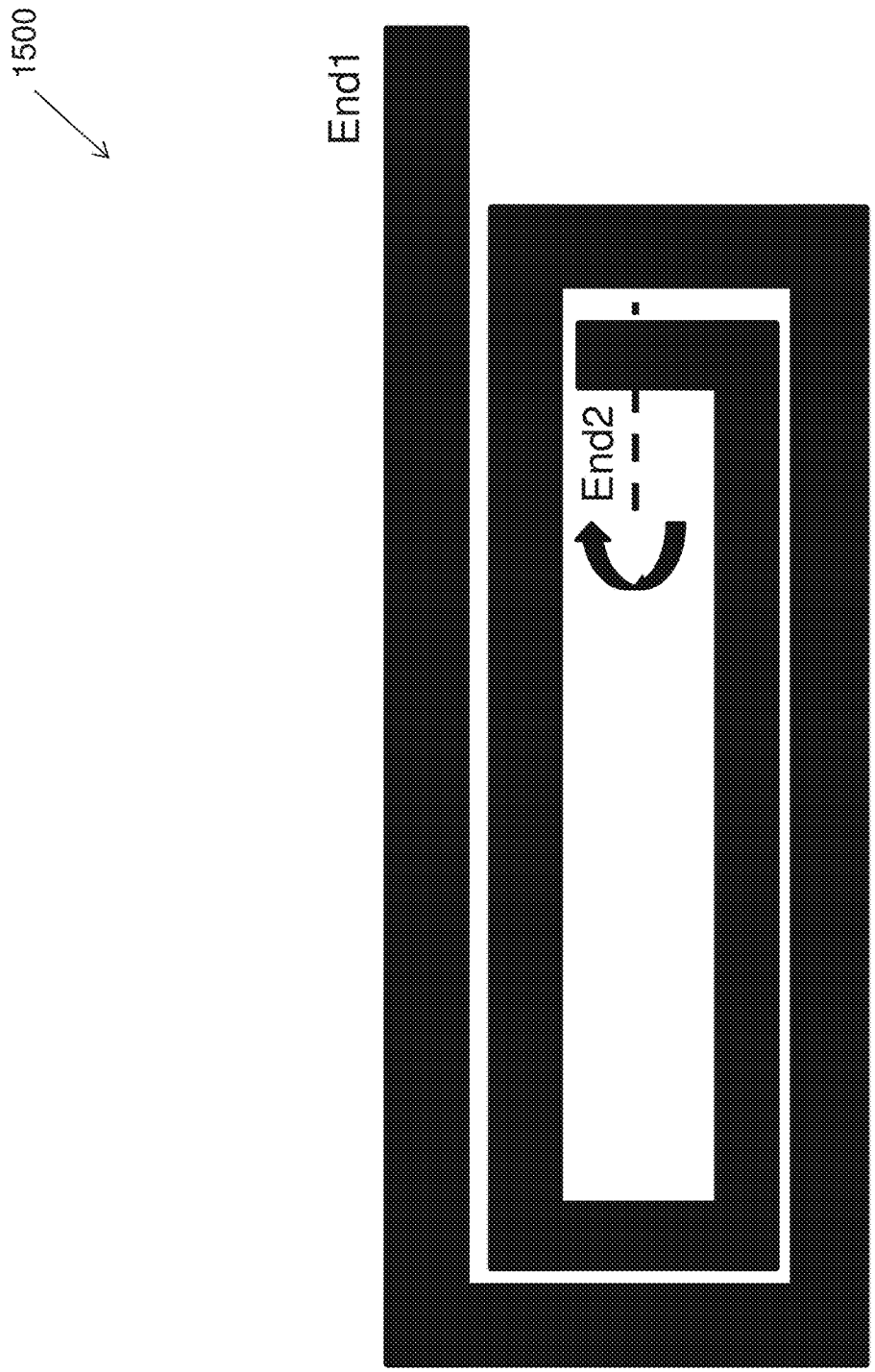
FIG. 15 illustrates a perspective view of a multi-turn coil in accordance with various embodiments of the present disclosure.
Figure 16:
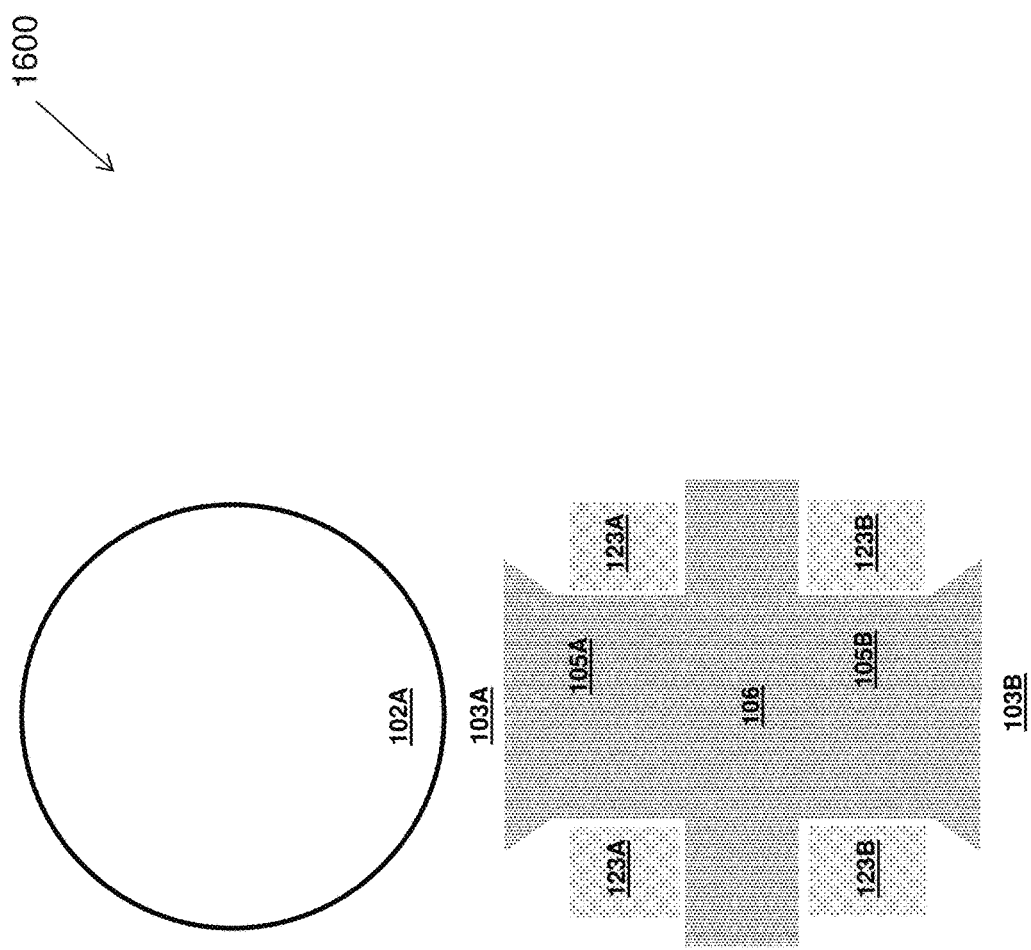
FIG. 16 illustrates a segment of a stator of a motor in accordance with various embodiments of the present disclosure.

To reduce the cost of windings, sometimes it is desirable to manufacture pre-formed coils with multiple turns. FIG. 15 shows an exemplary pre-formed stator coil with two turns in accordance with various embodiments of the present disclosure. This coil has two terminals End 1 and End 2. The two terminals can be used for interconnections, and can be shaped properly to make interconnection easier. For example, End 2 can be bent along the dotted line. To insert such a multi-turn pre-manufactured coil into the stator 100, the stator core can be divided into multiple segments, each being similar to the structure shown in FIG. 16, in which 105A and 105B are tooth area, while 106 is a yoke area. A coil consisting of 123A and 123B is located on each side of such a core segment.

Figure 17:
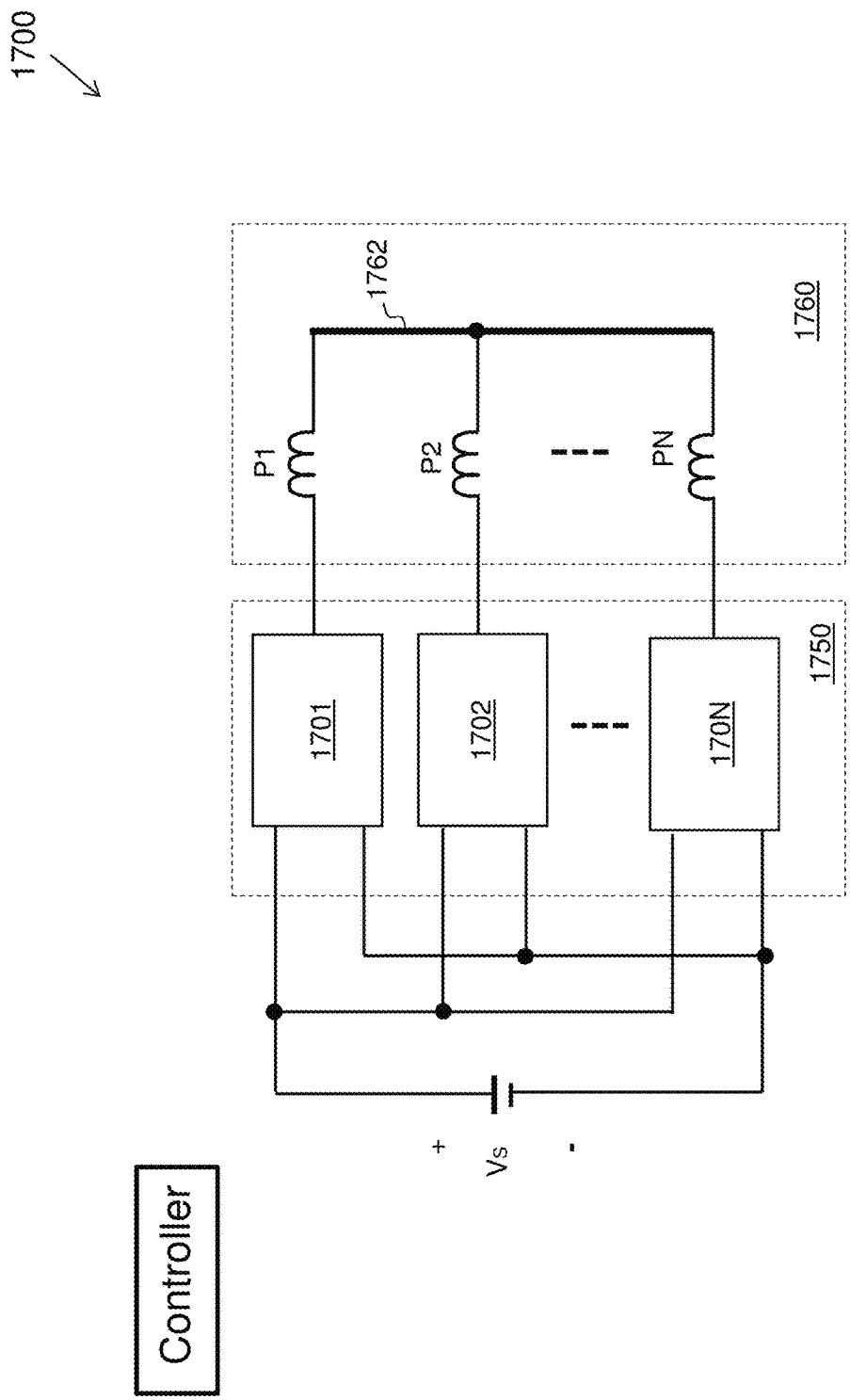
FIG. 17 illustrates a block diagram of a motor drive system in accordance with various embodiments of the present disclosure.

Appropriate power converters may be employed to control the motor. All the power converters can be connected to a single power source. FIG. 17 illustrates a block diagram of a motor system having N phases in accordance with various embodiments of the present disclosure. The motor system 1700 comprises N power converters, each coupled to a phase winding. All power converters 1701-170N are coupled to the input voltage (i.e. a power source) Vs. The power converters form a power converter group 1750. There are N phase windings in the motor 1760, denoted as phase P1, P2, ..., PN. Each phase winding (e.g., winding P1) has two terminals, the first coupled to a power converter (e.g., power converter 1701), and the second terminals of all or some phase windings may be connected together to form a star connection. It should be noted that the connection of the second terminals of phase windings may form a connection bar or connection ring 1762. The power converter group 1750 may be controlled as a multi-phase converter or N single phase converters to regulate the currents of the phase windings. Various topologies can be used for the power converters. For example, usually the power converters in FIG. 17 utilize a half-bridge topology.

Figure 18:
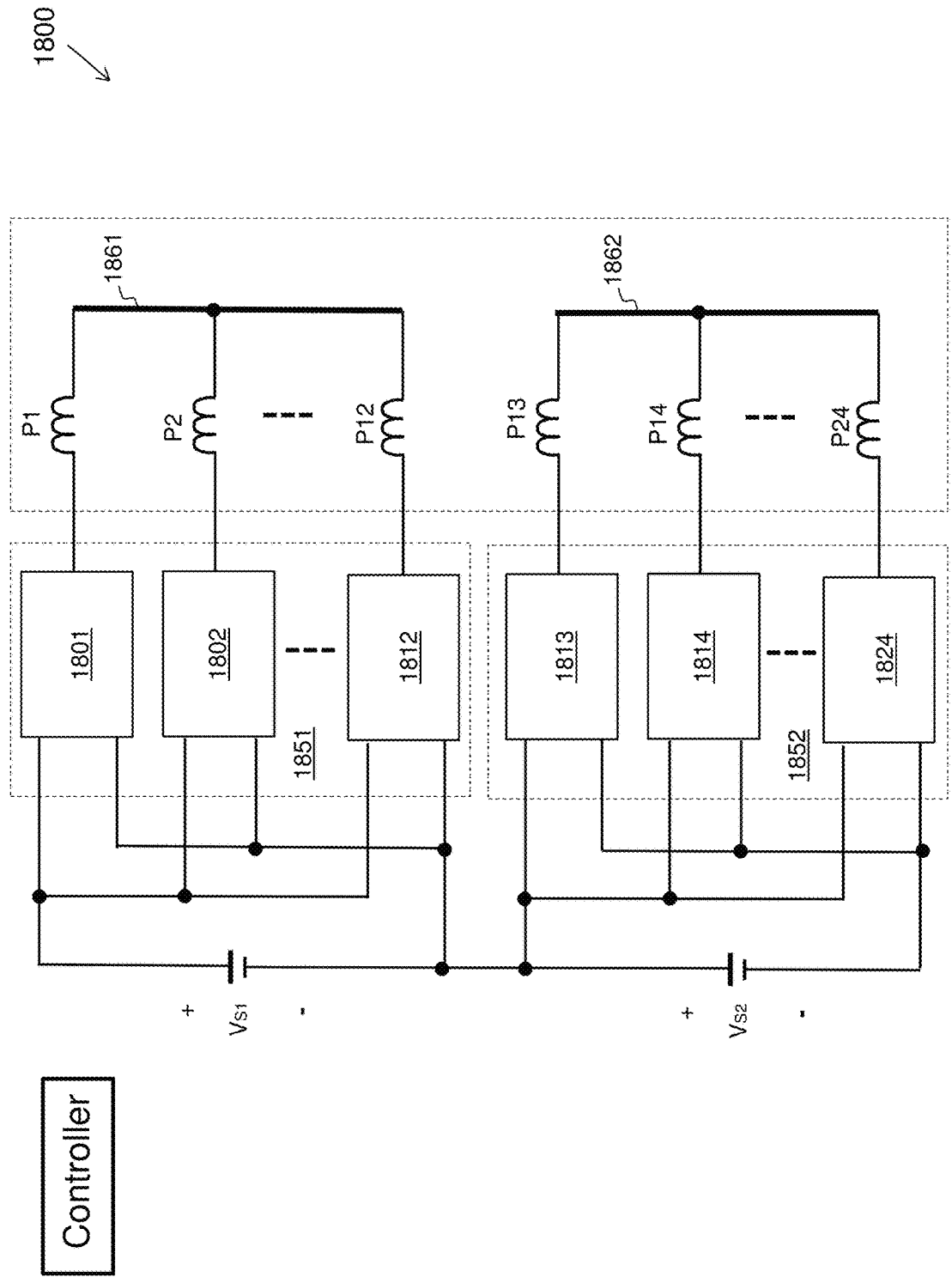
FIG. 18 illustrates another block diagram of a motor drive system in accordance with various embodiments of the present disclosure.

Sometimes it is advantageous to divide the phase windings into several symmetric groups sequentially or alternatively, and couple them through groups of power converters to a plurality of input voltage sources. These input voltage sources may be connected in series as is shown in FIG. 18, where two groups are shown with two input sources Vs1 and Vs2 connected in series. Of course, when needed different input sources may have no interconnection.

The first power converter group 1851 comprises 12 power converters 1801-1012. Each converter (e.g., power converter 1801) has an input coupled to the power source Vs1 and an output coupled to a corresponding phase winding (e.g. P1). As is shown in FIG. 18, a first end of each phase winding (e.g., P1) is coupled to the output of the corresponding power converter (e.g., power converter 1801). A second end of each phase winding is coupled to the connection bar or connection ring 1861.

Similarly, the second power converter group 1852 comprises 12 power converters 1813-1824. Each power converter (e.g., power converter 1813) has an input connected to the power source Vs2 and an output connected to a corresponding phase winding (e.g. P13). As is shown in FIG. 18, a first end of each phase winding (e.g., P13) is connected to the output of the corresponding power converter (e.g., power converter 1813). A second end of each phase winding is connected to the connection bar 1862.

The first power converter group 1851 and the second power converter group 1852 may be controlled to maintain a charging balance between Vs1 and Vs2, as they usually implemented as capacitors instead of independent power sources in actual designs.

Figure 19:
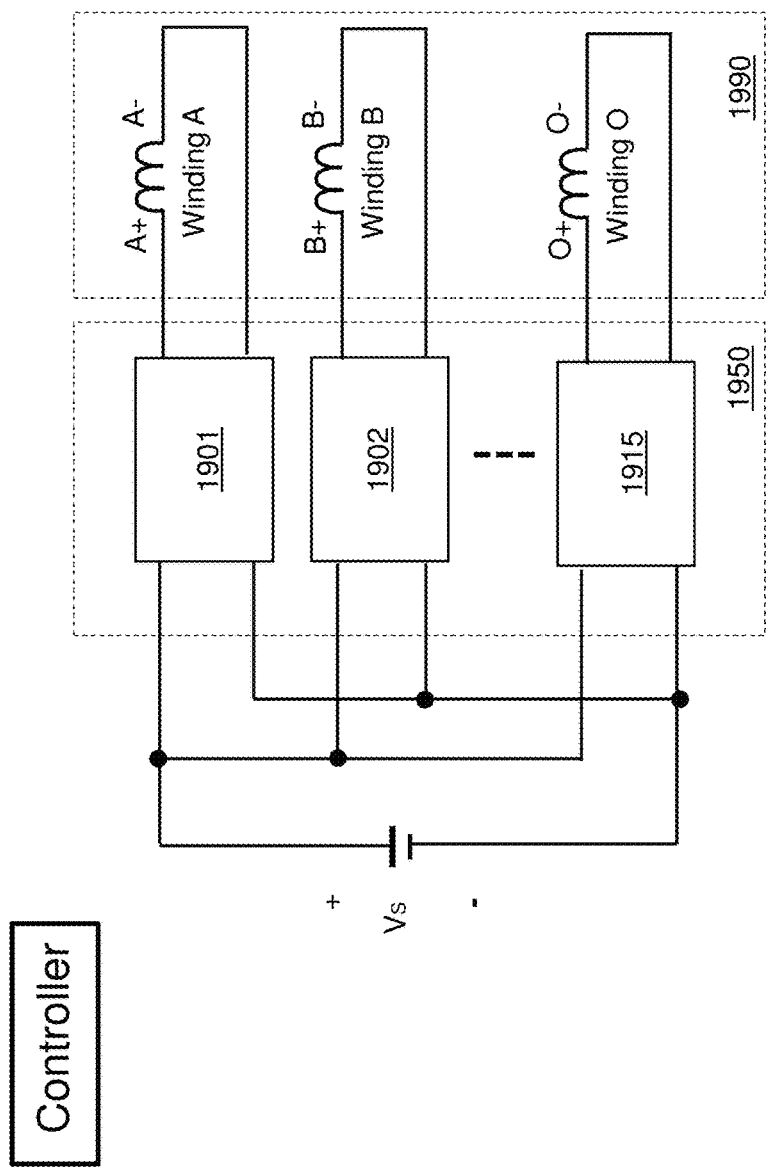
FIG. 19 illustrates a third block diagram of a motor drive system in accordance with various embodiments of the present disclosure.

Various topologies can be used in the power converters. FIG. 19 shows a configuration wherein both leads (terminals) of a phase winding are coupled to its associated power converter, so a full-bridge type of topology can be used.

The motor systems shown may be configured to dynamically change the number of poles and/or number of phases of the motor through adjusting the phase angels of the winding currents and/or disabling the operation of certain windings through controlling the power converters. One of the key objectives of the motor system is to obtain the best system energy efficiency by coordinating the operation of the motor and the power converters through controlling the amplitude, frequency and phase angle of the motor phase currents (the currents flowing through the phase windings). Moreover, a power loss of a key component in the system, or the combined power loss of the system including any combinations of the power converter loss, motor winding losses, motor magnetic material power losses and other losses, may be minimized over an intended range of operating conditions. The power converters should be configured to maintain an approximately smooth and even magnetic field distribution across each airgap even if there is mechanical asymmetry or other defects by regulating the voltage or current of the phase windings properly. For example, in induction machines, it is easier to achieve a smooth the strength of magnetic field in the airgap by controlling the voltages of the phase windings if the airgap is uneven, and thus the controller in a power converter may set the amplitude of voltage reference for each phase to be approximately the same. On the contrary, it may be better to control the currents of phase windings to have the same amplitude for PM machines for the same purpose. Also, harmonic injection (especially third order harmonic injection which allows a higher fundamental component with the same peak value of the overall waveform) should be used to improve the performance of the system. At low-speed high-torque applications, it is better to apply harmonic injection to the flux (for example, through magnetizing current control) to avoid or reduce magnetic saturation. At high speed operation where the performance of the system is more limited by available voltage, it is better to apply harmonic injection to the phase voltages, to increase the voltage amplitude at the fundamental frequency. As the flux saturation is reduced at higher number of poles, in a system where the number of poles of the motor is adjustable, a configuration with a high number of poles can be used when very high torque (and thus high flux) is needed. Therefore, the harmonic injection strategy and pole number can be dynamically adjusted in coordination according to operation requirements and conditions, particularly torque, speed, and dc link voltage.

Figure 20:
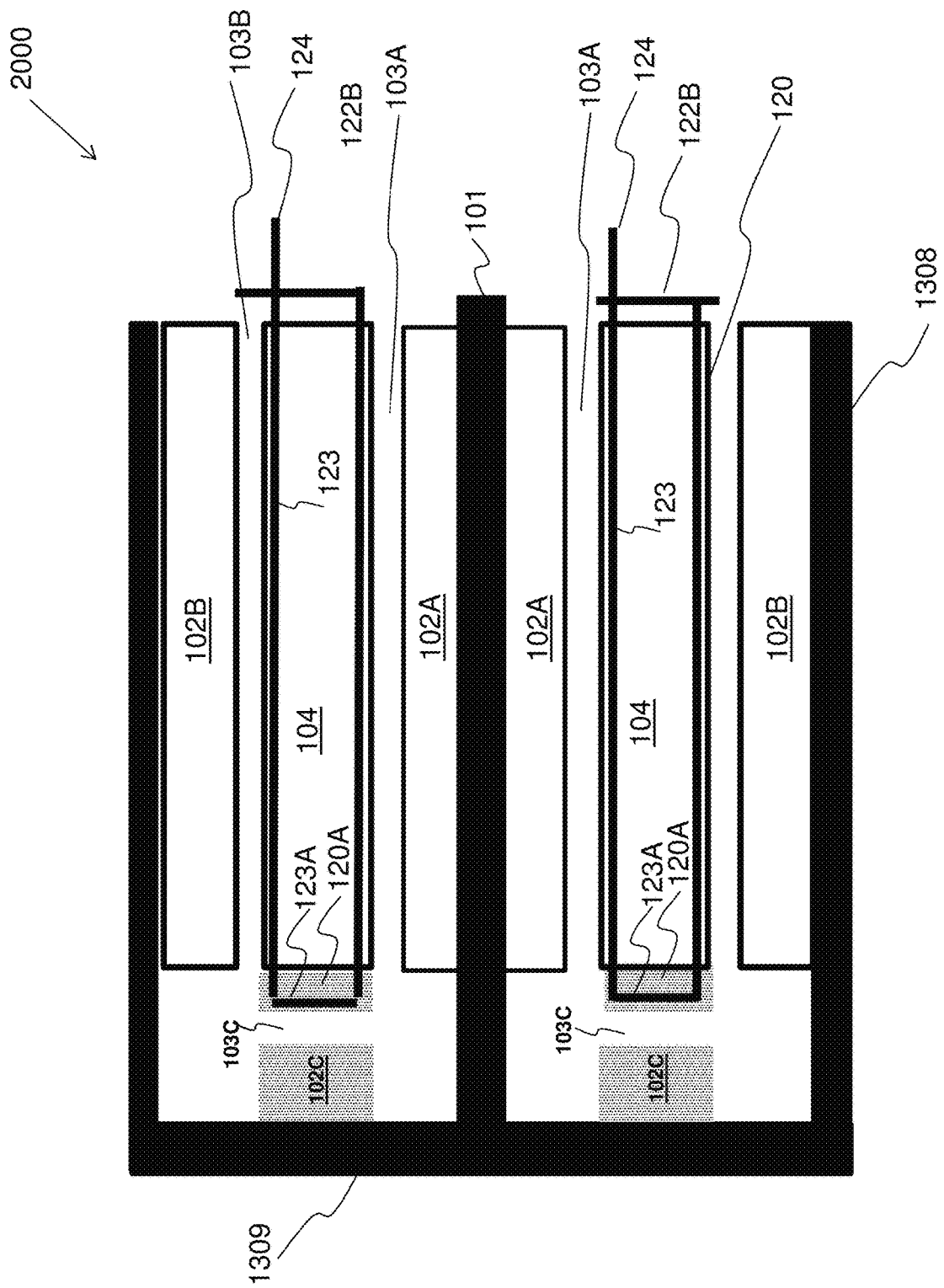
FIG. 20 illustrates a simplified side view of a motor with both radial and axial airgaps in accordance with various embodiments of the present disclosure.

FIG. 20 shows a configuration where an end stator core 120A is attached to the end of stator core 120 to facilitate the operation of the axial rotor 103C, which are applicable to various structures, such as those shown in FIGS. 13, 14 and 20. The material of the end stator core 120A may be the same as or different from that of the main rotor 100. The shape of the end stator core 120A may be configured to shape a good magnetic field in airgap 103C. In some embodiment, the end stator core 120A may be integrated with the main stator core 120. For example, cores 120 and 120A may be molded and baked into shape as a single piece from magnetic compounds such as ferrite or iron power.

Figure 21:
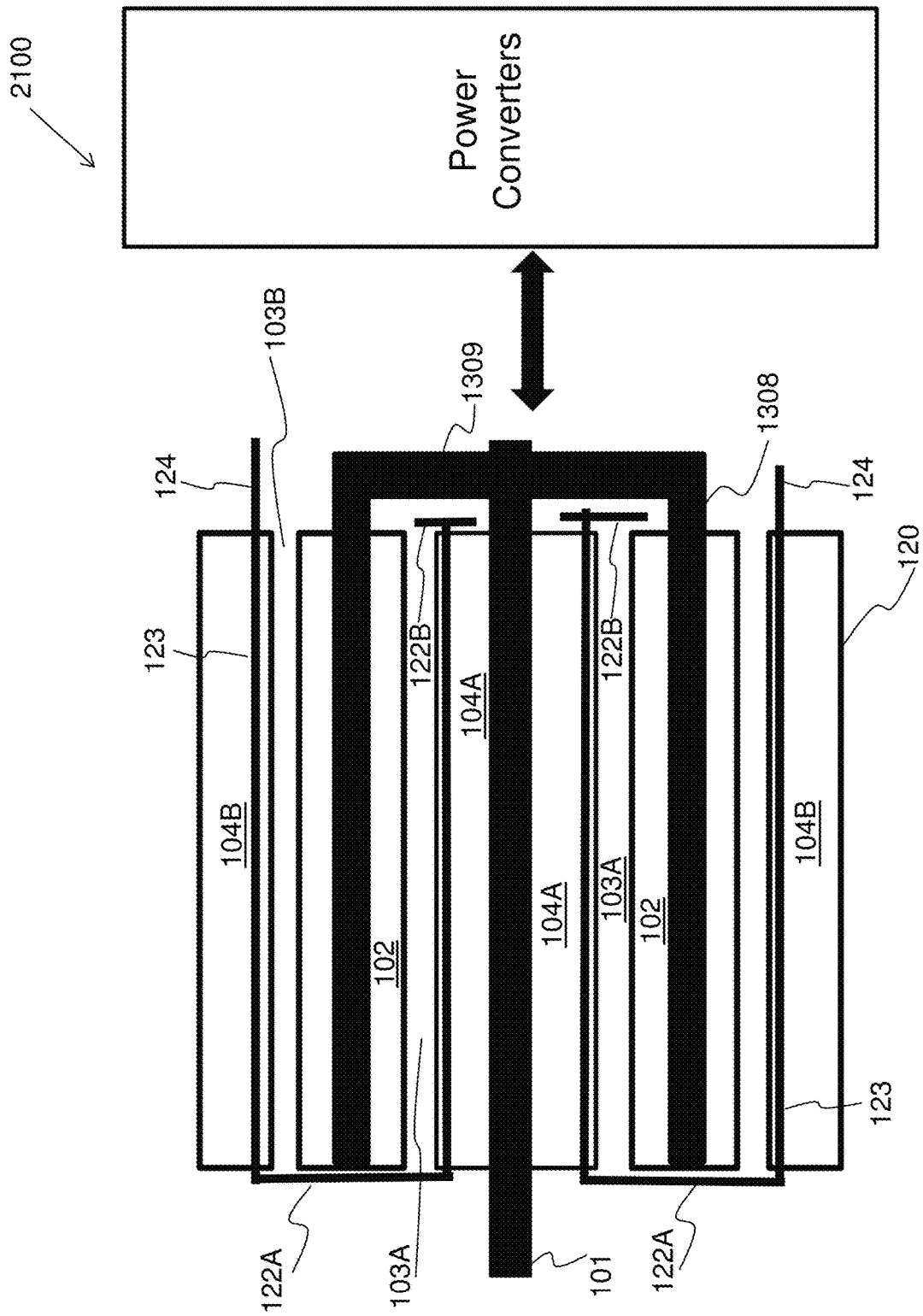
FIG. 21 illustrates a perspective view of a multi-airgap motor drive system with an outer stator topology in accordance with various embodiments of the present disclosure.

The innovation in this disclosure is also applicable to have a machine with multiple stators. FIG. 21 shown a configuration with multiple stators. The motor in the system 2100 has an inner stator 100A and an outer stator 100B. Stator windings are arranged radially, each having conductors in both the inner stator 100A and outer stator 100B. The winding connection 122B in inner stator 100A are arranged to connect the windings without interfering with the rotor 102. The power terminals 124 are connected to stator windings in outer stator 100B, and can be connected to power sources such as power converters, which may be located inside or outside the housing of the motor, without interfering with the rotor 102.

In the discussion about dynamic reconfiguration technology above, it is assumed that the rotors are able to follow the dynamic reconfiguration in the stator or stators automatically. This is true if the rotor is an induction type. However, machines in other types may also use a dynamical reconfiguration principle similar to DRIM. One example is switched reluctance machines. The rotor of a switched reluctance machine comprises salient poles without any power windings. In the switched reluctance machines, the stator has more salient magnetic features. The winding currents of the switched reluctance machine can be controlled to change the number of poles in the stator dynamically in operation to optimize the system performance over a wide range. Another example is memory-effect permanent magnet machines, where the number of poles may also be changed with the memory-effect magnets, so the number of poles in the windings can be dynamically reconfigured accordingly.

The discussion above uses one set of the stator windings as examples. The same principle is also applicable to motors and generators with more than one set of stator windings, such as certain double-fed motors and generators. Also, the same principles can be applied to rotor windings if needed. Although most discussions use distributed windings as examples, the technologies disclosed here can also be used with concentrated windings where partial slots are not needed.

Although the discussion above is generally based on motors, the techniques can be applied to generators or motors working in generating (regenerative) mode.

The discussion in this disclosure refers to motors and generators. The technology can be extended to actuators such as magnetic gears and other applications.

The discussion above is generally based on machines with cores and slots. However, it can be applied to machines without cores (air-core machines) and/or without slots (slotless machines). In a slotless machine, the conductors or conductor assemblies are evenly distributed along a perimeter in a machine as if there were evenly distributed slots, so the winding arrangements discussed in the present disclosure can still be used.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
 a stator with an inner surface and an outer surface, wherein:
  a plurality of first slots is distributed along the inner surface and is separated from each other by a plurality of first teeth;
  a plurality of second slots is distributed along the outer surface and is separated from each other by a plurality of second teeth; and
  a plurality of windings is located between the inner surface and the outer surface, each of the plurality of windings comprising a plurality of first conductors located in a first slot and a plurality of second conductors located in a second slot adjacent to the first slot, wherein one of the plurality of windings starts with a partial-phase slot in a direction;
 a plurality of rotors magnetically coupled to the stator, wherein a first rotor of the plurality of rotors faces the inner surface of the stator and a second rotor of the plurality of rotors faces the outer surface of the stator; and
 a first airgap between the inner surface of the stator and the first rotor, and a second airgap between the outer surface of the stator and the second rotor, wherein the plurality of first conductors, the first airgap, and the first rotor form a first submotor, and the plurality of second conductors, the second airgap, and the second rotor form a second submotor, and wherein the first submotor and the second submotor are so configured that the first rotor and the second rotor produce mechanical torques in a same direction when currents flow in the plurality of windings in an operation mode.

2. The apparatus of claim 1, wherein:
the first submotor and the second submotor are configured to have a similar electro-mechanical characteristic but produce different values of torques in the operation mode.

3. The apparatus of claim 2, wherein:
a length of the first airgap and a length of the second airgap are configured for a proper torque split between the first submotor and the second submotor.

4. The apparatus of claim 2, wherein:
one of the plurality of windings is configured to overcome the effect of uneven length in the first airgap or the second airgap.

5. The apparatus of claim 1, wherein:
the number of poles of at least one of the first submotor and the second submotor is dynamically adjustable by controlling the phase relationship of currents in neighboring windings.

6. The apparatus of claim 5, wherein:
the first submotor and the second submotor are induction motors; and
the first submotor and the second submotor are configured to reach their respective maximum mechanical torques approximately at a same slip frequency in the operation mode.

7. The apparatus of claim 1, wherein:
a position of the plurality of first teeth has a predetermined angular offset relative to a position of the plurality of second teeth.

8. The apparatus of claim 1, further comprising:
a third rotor facing an end of the stator.

9. The apparatus of claim 1, wherein:
one of the plurality of windings comprises a plurality of pre-formed coil structures.

10. A system comprising:
a stator with an inner surface and an outer surface, wherein:
  a plurality of first slots is distributed along the inner surface and is separated from each other by a plurality of first teeth;
  a plurality of second slots distributed along the outer surface and is separated from each other by a plurality of second teeth; and
  a plurality of windings is located between the inner surface and the outer surface, each of the plurality of windings comprising a plurality of first conductors in a first slot and a plurality of second conductors in a second slot adjacent to the first slot, wherein one of the plurality of windings starts with a partial-phase slot in a direction;
a plurality of rotors magnetically coupled to the stator, wherein a first rotor faces the inner surface of the stator and a second rotor faces the outer surface of the rotor;
a first airgap between the inner surface of the stator and the first rotor, and a second airgap between the outer surface of the stator and the second rotor, wherein the plurality of first conductors, the first airgap, and the first rotor form a first submotor, and the plurality of second conductors, the second airgap, and the second rotor form a second submotor; and
a plurality of power converters coupled to the plurality of windings, wherein the plurality of power converters are configured to control currents in the plurality of windings so that the first submotor and the second submotor are configured to produce mechanical torques in a same direction in an operation mode.

11. The system of claim 10, wherein:
the first rotor and the second rotor have different topologies.

12. The system of claim 10, wherein:
an output of the first rotor and an output of the second rotor are mechanically coupled to each other.

13. The system of claim 12, wherein:
the first rotor and the second rotor are configured to have similar electro-mechanical characteristics.

14. The system of claim 13, wherein:
a length of the first airgap and a length of the second airgap are designed to have a proper torque split between the first rotor and the second rotor.

15. A method comprising:
providing a stator with an inner surface and an outer surface, wherein:
  a plurality of first slots is distributed along the inner surface and is separated from each other by a plurality of first teeth; and
  a plurality of second slots is distributed along the outer surface and is separated from each other by a plurality of second teeth;
arranging a plurality of windings between the inner surface and the outer surface, each of the plurality of windings comprising a plurality of first conductors in a first slot and a plurality of second conductors in a second slot adjacent to the first slot;
providing a plurality of rotors magnetically coupled to the stator, wherein a first rotor of the plurality of rotors faces the inner surface of the stator and a second rotor of the plurality of rotors faces the outer surface of the stator;
arranging a first airgap between the inner surface of the stator and the first rotor, and a second airgap between the outer surface of the stator and the second rotor; and
arranging a third rotor facing an end of the stator and separated from the end of the stator through a third airgap; and
configuring the plurality of first conductors, the first airgap, and the first rotor to form a first submotor, and the plurality of second conductors, the second airgap, and the second rotor to form to a second submotor, so that the first submotor and the second submotor produce mechanical torques in a same direction in an operation mode.

16. The method of claim 15, wherein:
the first submotor and the second submotor have a similar electro-mechanical characteristic but produce different torque values, and wherein a length of the first airgap and a length of the second airgap are configured to achieve a proper split of power between the first submotor and the second submotor.

17. The method of claim 15, further comprising:
arranging a position of the plurality of first teeth to have a predetermined angular offset relative to a position of the plurality of second teeth.

18. The method of claim 15, further comprising:
configuring at least one of the first submotor and the second submotor so that the number of poles of the at least one of the first submotor and the second submotor is dynamically adjustable by controlling the phase relationship of currents in neighboring windings.

19. The method of claim 18, wherein:
the first rotor and the second rotor are induction rotors.

20. The method of claim 18, wherein one of the plurality of windings starts with a partial-phase slot in a direction.

* * * * *